US012155520B2

(12) United States Patent
Sengupta et al.

(10) Patent No.: US 12,155,520 B2
(45) Date of Patent: Nov. 26, 2024

(54) REFERENCE SIGNAL PATTERNS FOR MULTI-PATH CHANNEL ESTIMATION

(71) Applicant: QUALCOMM Incorporated, San Diego, CA (US)

(72) Inventors: Ayan Sengupta, San Diego, CA (US); Javier Rodriguez Fernandez, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 564 days.

(21) Appl. No.: 17/500,793

(22) Filed: Oct. 13, 2021

(65) Prior Publication Data
US 2023/0116477 A1 Apr. 13, 2023

(51) Int. Cl.
*H04L 27/26* (2006.01)
*H04L 5/00* (2006.01)
*H04W 4/06* (2009.01)

(52) U.S. Cl.
CPC ........ *H04L 27/2636* (2013.01); *H04L 5/0039* (2013.01); *H04L 27/26025* (2021.01); *H04L 27/2613* (2013.01); *H04W 4/06* (2013.01)

(58) Field of Classification Search
CPC ........... H04L 27/2636; H04L 27/26025; H04L 27/2613; H04W 4/06
See application file for complete search history.

(56) References Cited

U.S. PATENT DOCUMENTS

| | | | |
|---|---|---|---|
| 2015/0124688 A1* | 5/2015 | Xu | H04B 7/0452 370/312 |
| 2019/0090201 A1* | 3/2019 | Akkarakaran | H04W 52/346 |

\* cited by examiner

*Primary Examiner* — Samina F Choudhry
(74) *Attorney, Agent, or Firm* — Kevin M. Donnelly; Holland & Hart LLP

(57) ABSTRACT

Methods, systems, and devices for wireless communications are described. A device may receive a set of demodulation reference signals (DMRSs) over a multi-path channel on a set of resources in accordance with a reference signal pattern. The reference signal pattern may be associated with a non-uniform frequency spacing that results in a row-sampled Discrete Fourier Transform (DFT) matrix associated with the reference signal pattern having a lower coherence than other row-sampled DFT matrices. Additionally or alternatively, the device may receive a set of tracking reference signals (TRSs) over the multi-path channel. The set of TRSs may be specific to wide-area terrestrial broadcast services, single frequency network (SFN)-based broadcast services, multimedia broadcast multicast services (MBMSs), or the reference signal pattern. The device may perform channel estimation based on receiving one or both of the set of DMRSs or the set of TRSs over the multi-path channel.

30 Claims, 18 Drawing Sheets

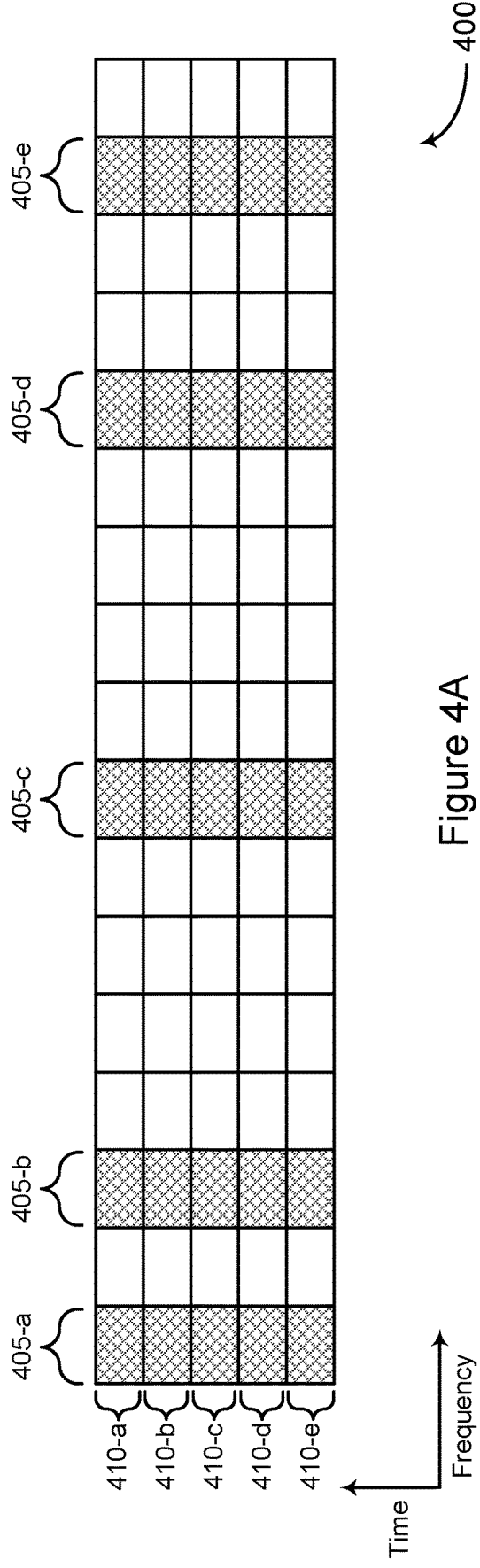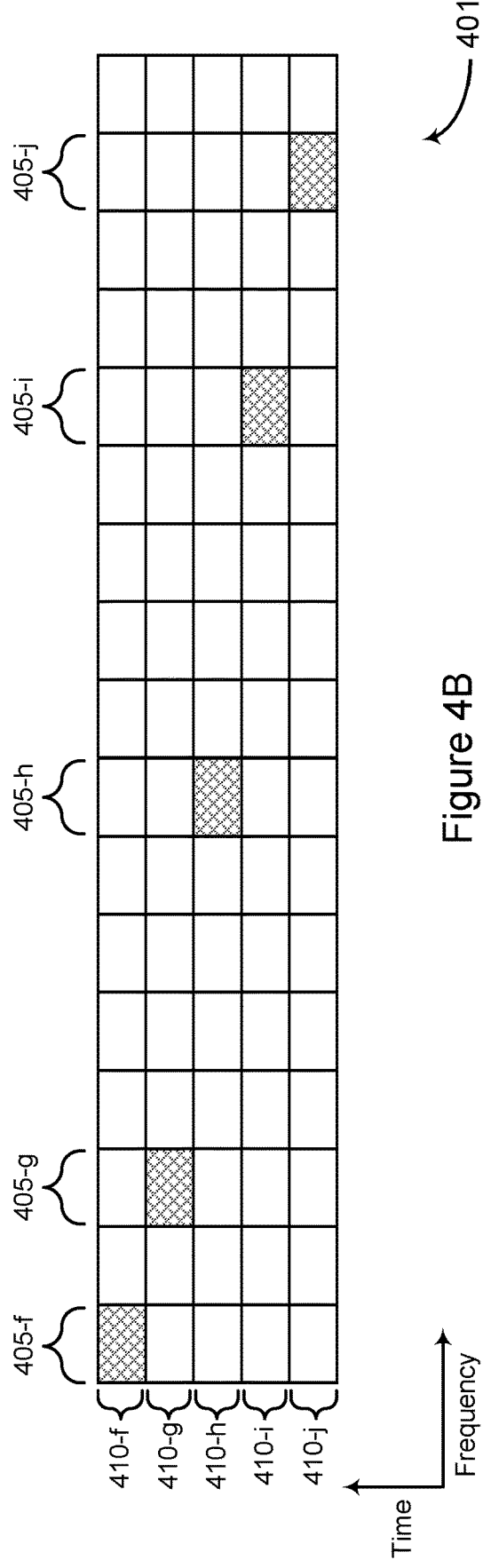

Receive, over a multi-path channel, a set of TRSs that is specific to wide-area terrestrial broadcast services, SFN-based broadcast services, MBMS, or a DMRS pattern associated with a non-uniform frequency spacing, the set of TRSs associated with a set of channel statistics corresponding to the multi-path channel ~1705

REFERENCE SIGNAL PATTERNS FOR MULTI-PATH CHANNEL ESTIMATION

TECHNICAL FIELD

The following relates to wireless communications, including reference signal patterns for multi-path channel estimation.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple devices by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems, which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include a set of base stations or a set of network access nodes, each simultaneously supporting communication for multiple communication devices, which may be otherwise known as user equipment (UE). Some of these communication devices may receive transmissions, such as multimedia broadcast multicast service (MBMS) transmissions, from other devices, such as a transmission-reception point (TRP). To improve the likelihood of these communication devices successfully receiving such transmissions, the communication devices may estimate various channel characteristics by performing measurements on reference signals received from the TRP. In some cases, the TRP may transmit the reference signals according to a transmission pattern, which may include multiple symbols and multiple subcarriers (for example, tones).

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communications at a device. The method may include receiving a set of reference signals on a set of resources in accordance with a first reference signal pattern, the set of resources associated with a data transmission, the first reference signal pattern associated with a non-uniform frequency spacing and a first row-sampled Discrete Fourier Transform (DFT) matrix with rows that correspond to indices of the first reference signal pattern, the first row-sampled DFT matrix having a lower coherence than a second row-sampled DFT matrix associated with a second reference signal pattern that has a uniform frequency spacing, receiving the data transmission over a multi-path channel on the set of resources, and decoding the data transmission based on the received set of reference signals.

Another innovative aspect of the subject matter described in this disclosure can be implemented in an apparatus for wireless communications at a device. The apparatus may include a processor, memory coupled with the processor, and instructions stored in the memory. The instructions may be executable by the processor to cause the apparatus to receive a set of reference signals on a set of resources in accordance with a first reference signal pattern, the set of resources associated with a data transmission, the first reference signal pattern associated with a non-uniform frequency spacing and a first row-sampled DFT matrix with rows that correspond to indices of the first reference signal pattern, the first row-sampled DFT matrix having a lower coherence than a second row-sampled DFT matrix associated with a second reference signal pattern that has a uniform frequency spacing, receive the data transmission over a multi-path channel on the set of resources, and decode the data transmission based on the received set of reference signals.

Another innovative aspect of the subject matter described in this disclosure can be implemented in an apparatus for wireless communications at a device. The apparatus may include means for receiving a set of reference signals on a set of resources in accordance with a first reference signal pattern, the set of resources associated with a data transmission, the first reference signal pattern associated with a non-uniform frequency spacing and a first row-sampled DFT matrix with rows that correspond to indices of the first reference signal pattern, the first row-sampled DFT matrix having a lower coherence than a second row-sampled DFT matrix associated with a second reference signal pattern that has a uniform frequency spacing, means for receiving the data transmission over a multi-path channel on the set of resources, and means for decoding the data transmission based on the received set of reference signals.

Another innovative aspect of the subject matter described in this disclosure can be implemented in a non-transitory computer-readable medium storing code for wireless communications at a device. The code may include instructions executable by a processor to receive a set of reference signals on a set of resources in accordance with a first reference signal pattern, the set of resources associated with a data transmission, the first reference signal pattern associated with a non-uniform frequency spacing and a first row-sampled DFT matrix with rows that correspond to indices of the first reference signal pattern, the first row-sampled DFT matrix having a lower coherence than a second row-sampled DFT matrix associated with a second reference signal pattern that has a uniform frequency spacing, receive the data transmission over a multi-path channel on the set of resources, and decode the data transmission based on the received set of reference signals.

One innovative aspect of the subject matter described in this disclosure can be implemented in a method for wireless communications at a device. The method may include receiving, over a multi-path channel, a set of tracking reference signals (TRSs) that is specific to one or more of wide-area terrestrial broadcast services, single frequency network (SFN)-based broadcast services, multimedia broadcast multicast services (MBMS), or a demodulation reference signal (DMRS) pattern associated with a non-uniform frequency spacing, the set of TRSs associated with a set of channel statistics corresponding to the multi-path channel.

Another innovative aspect of the subject matter described in this disclosure can be implemented in an apparatus for wireless communications at a device. The apparatus may include a processor, memory coupled with the processor, and instructions stored in the memory. The instructions may be executable by the processor to cause the apparatus to receive, over a multi-path channel, a set of TRSs that is specific to one or more of wide-area terrestrial broadcast services, SFN-based broadcast services, MBMS, or a DMRS pattern associated with a non-uniform frequency spacing, the set of TRSs associated with a set of channel statistics corresponding to the multi-path channel.

Another innovative aspect of the subject matter described in this disclosure can be implemented in an apparatus for wireless communications at a device. The apparatus may include means for receiving, over a multi-path channel, a set of TRSs that is specific to one or more of wide-area terrestrial broadcast services, SFN-based broadcast services, MBMS, or a DMRS pattern associated with a non-uniform frequency spacing, the set of TRSs associated with a set of channel statistics corresponding to the multi-path channel.

Another innovative aspect of the subject matter described in this disclosure can be implemented in a non-transitory computer-readable medium storing code for wireless communications at a device. The code may include instructions executable by a processor to receive, over a multi-path channel, a set of TRSs that is specific to one or more of wide-area terrestrial broadcast services, SFN-based broadcast services, MBMS, or a DMRS pattern associated with a non-uniform frequency spacing, the set of TRSs associated with a set of channel statistics corresponding to the multi-path channel.

BRIEF DESCRIPTION OF THE DRAWINGS

FIGS. 4A and 4B illustrate examples of resource mappings that support reference signal patterns for multi-path channel estimation in accordance with aspects of the present disclosure.

FIGS. 15-18 show flowcharts illustrating methods that support reference signal patterns for multi-path channel estimation in accordance with aspects of the present disclosure.

DETAILED DESCRIPTION

Figure 1:
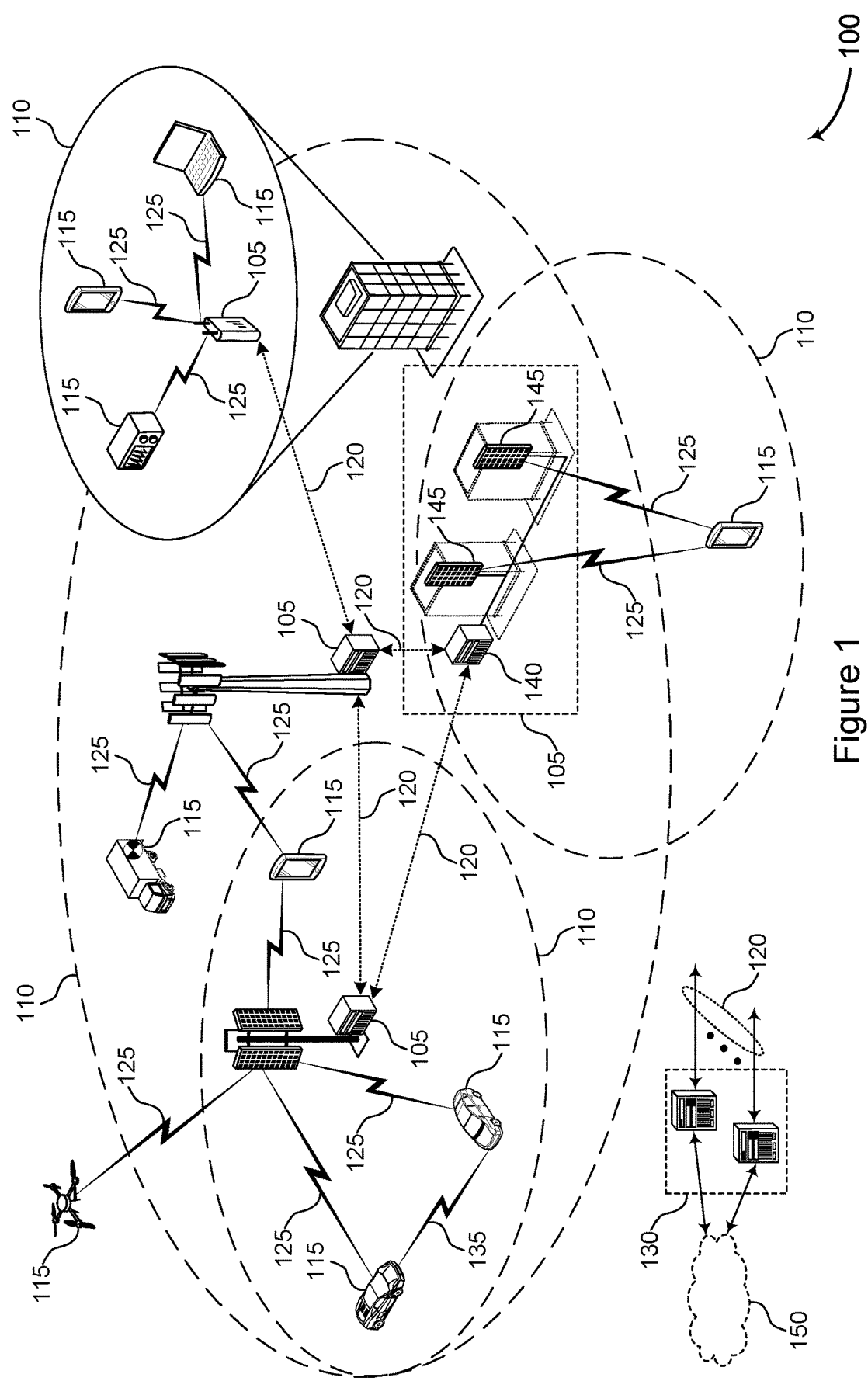
FIGS. 1 and 2 illustrate examples of wireless communications systems that support reference signal patterns for multi-path channel estimation in accordance with aspects of the present disclosure.

A communication device (for example, a user equipment (UE)) may receive transmissions, such as multimedia broadcast multicast (MBMS) transmissions or reference signals, from other devices, such as transmission-reception points (TRPs). In some cases, the communication device may receive these transmissions from respective TRPs over a multi-path channel associated with a relatively large delay spread (for example, a delay spread that is above a threshold). The multi-path channel may include a combination of different paths between the communication device and the TRPs. For example, the multi-path channel may include a first path between the communication device and a first TRP and a second path between the communication device and a second TRP. The TRPs may be synchronized, and may transmit the same transmission to the communication device over different paths of the multi-path channel.

To improve the likelihood of the communication device successfully receiving the transmissions, the communication device may estimate various characteristics of the multi-path channel. For example, the communication device may perform measurements on reference signals, such as tracking reference signals (TRSs) or demodulation reference signals (DMRSs), received from respective TRPs over the multi-path channel (for example, over respective paths between the TRPs and the communication device). Each of the TRPs may transmit respective reference signals to the communication device according to a transmission pattern that includes multiple symbols and multiple subcarriers (for example, tones). The TRPs may be synchronized, and may transmit these respective reference signals to the communication device in accordance with a single transmission pattern. However, this transmission pattern may be associated with relatively high signaling overhead. Moreover, this transmission pattern may not be suitable for multi-path channels with relatively large delay spreads.

Various aspects of this disclosure generally relate to configuring a communication device (such as a UE) to receive reference signals on resources that are associated with a set of reference signal patterns. In some examples, the communication device may receive a set of reference signals (for example, DMRSs) on a set of resources associated with a reference signal pattern. The reference signal pattern may include multiple constituent sub-patterns, and the set of resources may include multiple sets of resources corresponding to the multiple constituent sub-patterns. The reference signal pattern may be associated with a non-uniform frequency spacing. More specifically, the set of resources associated with the reference signal pattern may include multiple sets of subcarrier indices, each of which may be associated with a respective uniform frequency spacing. For example, the set of resources may include a first set of subcarrier indices associated with a first uniform frequency spacing and a second set of subcarrier indices associated with a second uniform frequency spacing that is different than (for example, indivisible by or co-prime with) the first uniform frequency spacing.

Due to the first set of subcarrier indices and the second set of subcarrier indices being associated with different uniform frequency spacings, the set of resources may collectively be associated with a non-uniform frequency spacing. This non-uniform frequency spacing may result in the received set of reference signals having a low coherence. More specifically, a row-sampled version of a Discrete Fourier Transform (DFT) matrix associated with the reference signal pattern (e.g., a DFT matrix with rows corresponding to subcarrier indices associated with the reference signal pattern) may have a lower coherence (e.g., a maximum absolute value of cross-correlations between columns of the DFT matrix) than DFT matrices associated with reference signal patterns that have uniform frequency spacings. Coherence is used in compressed sensing to statistically quantify how effectively a sensing object (for example, a reference signal pattern) can be used to estimate an underlying sparse signal (for example, a signal that is sparse in the time-domain).

Additionally or alternatively, the communication device may receive a set of TRSs that is specific to wide-area broadcast services, single frequency network (SFN)-based broadcast services, MBMS, or a DMRS pattern associated with a non-uniform frequency spacing. In comparison to other TRSs, the received set of TRSs may include more subcarriers (for example, a denser frequency spacing) and fewer symbols (for example, a sparser symbol spacing). The set of TRSs may be associated with a set of channel statistics corresponding to the multi-path channel. For example, the set of TRSs may be associated with a power delay profile (PDP) of the multi-path channel. The PDP may indicate an intensity of the received set of TRSs as a function of a delay spread associated with the received set of TRSs. The delay spread may refer to a time difference between an earliest time at which a TRS from the set of TRSs arrives at the communication device and a latest arrival time at which a TRS from the set of TRSs arrives at the communication device.

Particular aspects of the subject matter described in this disclosure may be implemented to realize the following potential advantages. The techniques described herein may provide improvements to channel estimation. For example, a communication device may improve the signaling efficiency and accuracy of channel estimation operations associated with multi-path channels (for example, channels with relatively large delay spreads, channels with sparse time-domain channel impulse responses) by using reference signal patterns that are associated with relatively lower signaling overhead (for example, fewer resources) and combinatorial properties (for example, coherence) that are desirable for sparse channel estimation. Performing channel estimation operations with improved signaling efficiency and accuracy may increase the likelihood of the communication device successfully receiving transmissions over multi-path channels, among other benefits.

Aspects of the disclosure are initially described in the context of wireless communications systems, channel response diagrams, resource diagrams, block diagrams, and process flows. Aspects of the disclosure are further illustrated by and described with reference to apparatus diagrams, system diagrams, and flowcharts that relate to reference signal patterns for multi-path channel estimation.

FIG. 1 illustrates an example of a wireless communications system 100 that supports reference signal patterns for multi-path channel estimation in accordance with aspects of the present disclosure. The wireless communications system 100 may include a set of base stations 105, a set of UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, or communications with low-cost and low-complexity devices.

The base stations 105 may be dispersed throughout a geographic area to form the wireless communications system 100 and may be devices in different forms or having different capabilities. The base stations 105 and the UEs 115 may wirelessly communicate via a set of communication links 125. Each base station 105 may provide a coverage area 110 that the UEs 115 and the base station 105 may establish a set of communication links 125. The coverage area 110 may be an example of a geographic area that a base station 105 and a UE 115 may support the communication of signals according to a set of radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through a set of backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include a set of wireless links.

A set of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The d115 and the base stations 105 may wirelessly communicate with one another via a set of communication links 125 over a set of carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to a set of physical layer channels for a given radio access technology (for example, LTE, LTE-A, LTE-A Pro, NR). Each physical layer channel may carry acquisition signaling (for example, synchronization signals, system information), control signaling that coordinates operation for the carrier, data, or other signaling. The wireless communications system 100 may support communication with a UE 115 using carrier aggregation or multi-carrier operation. A UE 115 may be configured with multiple downlink component carriers and a set of uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode, in which initial acquisition and connection may be conducted by the UEs 115 via the carrier, or the carrier may be operated in a non-standalone mode, in which a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol duration (for example, a duration of one modulation symbol) and one subcarrier, in which the symbol duration and subcarrier spacing are inversely related. The number of bits carried by each resource element may depend on the modulation scheme (for example, the order of the modulation scheme, the coding rate of the modulation scheme, or both). The more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

A set of numerologies for a carrier may be supported, in which a numerology may include a subcarrier spacing ($\Delta f$) and a cyclic prefix. A carrier may be divided into a set of BWPs having the same or different numerologies. In some examples, a UE 115 may be configured with multiple BWPs. In some examples, a single BWP for a carrier may be active at a given time and communications for the UE 115 may be restricted to a set of active BWPs.

The time intervals for the base stations 105 or the UEs 115 may be expressed in multiples of a basic time unit, which may, for example, refer to a sampling duration of $T_s=1/(\Delta f_{max} \cdot N_f)$ seconds, in which $\Delta f_{max}$ may represent a threshold supported subcarrier spacing, and $N_f$ may represent a threshold supported DFT size. Time intervals of a communications resource may be organized according to radio frames each having a specified duration (for example, 10 milliseconds (ms)). Each radio frame may be identified by a system frame number (for example, ranging from 0 to 1023).

Each frame may include multiple consecutively numbered subframes or slots, and each subframe or slot may have the same duration. In some examples, a frame may be divided (for example, in the time-domain) into subframes, and each subframe may be further divided into a number of slots. Alternatively, each frame may include a variable number of slots, and the number of slots may depend on subcarrier spacing. Each slot may include a number of symbol durations (for example, depending on the length of the cyclic prefix prepended to each symbol duration). In some wireless communications systems, a slot may further be divided into multiple mini-slots containing a set of symbols. Excluding the cyclic prefix, each symbol duration may contain a set of (for example, $N_f$) sampling durations. The duration of a symbol duration may depend on the subcarrier spacing or frequency band of operation.

A subframe, a slot, a mini-slot, or a symbol may be the smallest scheduling unit (for example, in the time-domain) of the wireless communications system 100 and may be referred to as a transmission time interval (TTI). In some examples, the TTI duration (for example, the number of symbol durations in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using a set of time division multiplexing (TDM) techniques, frequency division multiplexing (FDM) techniques, or hybrid TDM-FDM techniques. A control region (for example, a control resource set (CORESET)) for a physical control channel may be defined by a number of symbol durations and may extend across the system bandwidth or a portion of the system bandwidth of the carrier. A set of control regions (for example, CORESETs) may be configured for a set of the UEs 115. For example, a set of the UEs 115 may monitor or search control regions for control information according to a set of search space sets, and each search space set may include one or multiple control channel candidates in a set of aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via a set of cells, for example a macro cell, a small cell, a hot spot, or other types of cells. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) that the logical communication entity operates. Such cells may range from smaller areas (for example, a structure, a portion of the structure) to larger areas depending on various factors such as the capabilities of the base station 105. For example, a cell may be or include a building, a section of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, with respect to a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with a home or office). A base station 105 may support one or multiple cells and may also support communications over the set of cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and may provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network, in which different types of the base stations 105 provide coverage for various geographic coverage areas 110 using the same or different radio access technologies.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode for cases, in which the UEs 115 are not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by a set of services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). A set of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via a set of network nodes (for example, base stations 105) using vehicle-to-network (V2N) communications, or with both.

The core network 130 may provide authentication, access authorization, tracking, Internet Protocol (IP) connectivity, and other access, routing, or mobility functions. The core network 130 may be an evolved packet core (EPC) or 5G core (5GC), which may include a control plane entity that manages access and mobility (for example, a mobility management entity (MME), an access and mobility management function (AMF)) and a user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. IP packets may be transferred through the user plane entity, which may provide IP address allocation as well as other functions. The user plane entity may be connected to IP services 150 for a set of network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through a set of other access network transmission entities 145, which may be referred to as radio heads, smart radio heads, or TRPs. Each access network transmission entity 145 may include a set of antenna panels. In some configurations, various functions of each access network entity 140 or base station 105 may be distributed across various network devices (for example, radio heads and ANCs) or consolidated into a single network device (for example, a base station 105).

The wireless communications system 100 may operate using a set of frequency bands in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) with respect to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. For operations in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within a set of antenna arrays or antenna panels, which may support MIMO operations or transmit or receive beamforming. For example, a set of base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have a set of antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiving device, and multiple-user MIMO (MU-MIMO), in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for a set of beam directions, and the feedback may correspond to a configured number of beams across a system bandwidth or a set of sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in a set of directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, in which the device may provide HARQ feedback in a specific slot for data received in a previous symbol in the slot. In other cases, the device may provide HARQ feedback in a subsequent slot, or according to some other time interval.

DMRSs, equivalently referred to herein as pilots, pilot tones, or pilot reference signals, are used in cellular communications to estimate a channel at a receiving device (for example, a UE 115) and to perform coherent demodulation. DMRSs may effectively sample the channel in the frequency-domain. Channel estimates for the subcarriers can be obtained using interpolation functions (for example, minimum mean square error (MMSE)-based interpolations or fast Fourier transform (FFT)-based interpolations) that are based on DMRS estimates. Some reference signal patterns (for example, uplink or downlink DMRS patterns) used in LTE and NR may be classified as uniform reference signal patterns. These DMRSs may uniformly sample the channel in frequency. Uniform reference signal patterns may be based on the Nyquist sampling theorem, which may indicate a threshold delay spread of the channel that can be estimated within an equalization interval (EI). An EI may be equivalent to the inverse of inter-DMRS spacing.

Wide-area terrestrial broadcast networks (for example, SFNs with large delay spreads) may include multiple co-operating TRPs, which may be equivalently referred to herein as transmitting devices, SFN transmitters, or access network transmission entities 145, among other examples. In some examples, these co-operating TRPs may function as an SFN with respect to a UE 115, such that a resultant channel observed by a UE 115 has several characteristics. In some cases, a threshold delay spread of the resultant channel may be relatively large (for example, up to 900 microseconds (μs)), and may be proportional to an inter-site distance (ISD) between the co-operating TRPs. To transmit over such channels, a relatively long cyclic prefix (CP) and a relatively small subcarrier spacing (for example, 370 Hz) numerology may be employed. For such cases, some taps (for example, impulses) of the channel may be outside the CP, even for relatively large CP values (for example, 300 μs). Also, the resultant channels may be sparse in the delay-domain, otherwise known as the time-domain. For example, a number of taps or tap clusters may be proportional to a number of transmitters co-operating to form the SFN, with many zeroes in the channel impulse response (CIR).

For wide-area broadcast channels, uniform sampling of the channel in frequency may not utilize the inherent sparsity of the channels with respect to the delay-domain CIR. A low to moderate rate of uniformly sampling the channel in frequency may be ineffective for cases in which there are taps with relatively large delays. If the EI of a uniform reference signal pattern is not large enough to cover the tap with the largest delay, the channel sampling may result in aliasing. To mitigate this aliasing issue, a uniform pattern that is relatively dense in frequency (for example, a uniform pattern with a relatively large EI) may be used to correctly identify all taps up to and including the tap with the largest delay. In some cases, using such a pattern may be associated with prohibitive reference signal overhead. In some cases, properties of compressed sensing may be used to reduce the reference signal overhead of uniform patterns, considering the sparse time-domain characteristics of such channels. Compressed sensing may utilize delay-domain sparsity to improve sampling accuracy. For example, compressed sensing may support relatively sparse sampling of the channel in the frequency-domain, which may reduce signaling overhead while enabling devices to mitigate aliasing by using DMRS patterns with suitable mathematical properties.

The use of DMRS patterns described herein may depend on the UE 115 obtaining accurate large-scale channel statistics (for example, PDP) of multi-path channels that have relatively large delay spreads. In such cases, a quasi co-location (QCL) source may enable determination of large-scale statistics for such large delay-spread channels. The signal corresponding to the QCL source may have a relatively dense spacing in the frequency-domain to accurately estimate PDP with a relatively large delay spread. Moreover, because wide-area broadcast transmissions (for example, MBMS over multicast broadcast SFN (MBSFN)) may be configured semi-statically, this QCL source may be configured via MBMS information elements (IEs) without using downlink control information (DCI).

Figure 2:
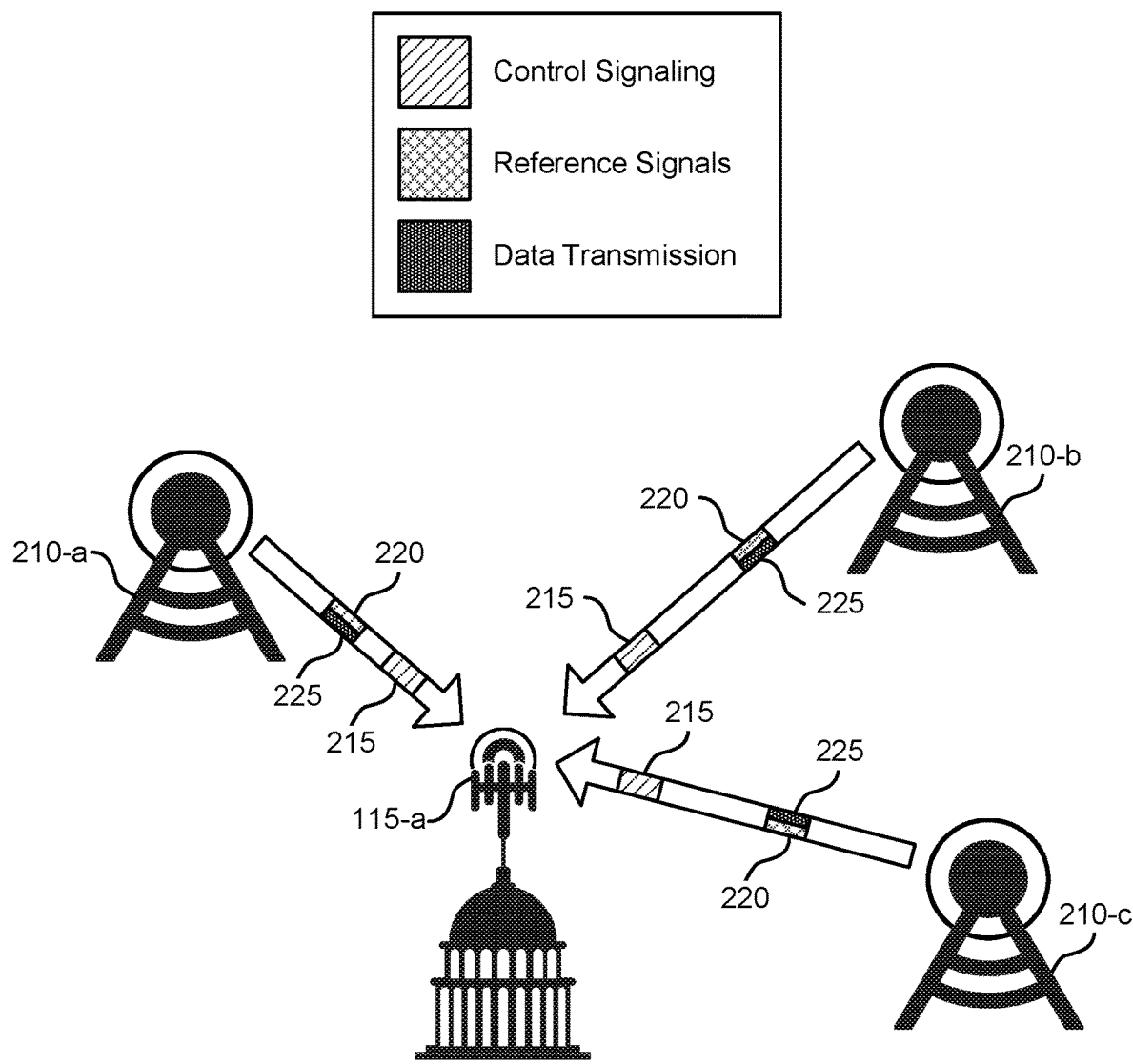

FIG. 2 illustrates an example of a wireless communications system 200 that supports reference signal patterns for multi-path channel estimation in accordance with aspects of the present disclosure. The wireless communications system 200 may implement or be implemented by aspects of the wireless communications system 100. For example, the wireless communications system 200 may include a UE 115-a, which may be an example of a UE 115 described with reference to FIG. 1. The wireless communications system 200 may also include a TRP 210-a, a TRP 210-b, and a TRP 210-c, which may be examples of a base station 105 or an access network transmission entity 145 described with reference to FIG. 1. In the wireless communications system 200, the UE 115-a may perform channel estimation based on receiving reference signals 220 from the TRPs 210.

Non-uniform sampling may be attained using a corresponding DMRS pattern with specific combinatorial characteristics derived from sparse sampling or compressed sensing principles. These combinatorial objects (for example, the DMRS subcarrier indices) may effectively meet the Welch bound (for example, a proxy for channel estimation performance) out of all possible DMRS patterns with a specific signaling overhead. These DMRS patterns, which may be based on difference sets, can be associated with relatively high complexity (for example, with respect to UE channel estimation receiver design). Other DMRS patterns may be implemented with lower complexity, with coherence values (for example, in terms of compressed sensing) that are closer to the Welch bound than DMRS patterns that sample channels uniformly in frequency. In some cases, these patterns may be configured for sparse channels, and may be approximate Welch-bound patterns for a specific signaling overhead.

The DMRS subcarriers for a symbol may be derived from specific combinatorial objects, which may include difference sets (for example, Singer difference sets or approximate difference sets) or interlaced regular patterns. Interlaced regular patterns may be formed by a union (for example, a combination) of uniform patterns with corresponding DMRS spacings and initial subcarrier offsets. An interlaced regular pattern may include two or more constituent regular (for example, uniform) sub-patterns. For cases in which a DMRS pattern is staggered over a number of symbols or for cases in which a UE 115 is configured to de-stagger DMRS tones from various symbols, the union of the DMRS tones over all symbols may have desirable combinatorial properties (for example, low coherence). For an interlaced regular pattern, there may be a time-stagger pattern that specifies which DMRS tones in the interlaced regular pattern appear in which symbol. Some time-stagger patterns may include a different uniform sub-pattern for each symbol, which may be referred to as a uniform pattern for each symbol. However, the combination of these uniform sub-patterns may still be considered a non-uniform pattern.

These DMRS patterns may be associated with power-boosting schemes that are specific to the DMRS patterns, and may be defined or indicated via a configuration. The patterns described herein may apply to transmission of some logical channels, and may not apply to other channels. For example, in a terrestrial broadcast setting, these patterns may be employed for traffic channels (for example, a multicast traffic channel (MTCH)), while other patterns may be employed for control channels (for example, a multicast control channel (MCCH)). Multiple patterns may be defined, and may be configured for different levels of sparsity in the delay-domain. These patterns may have differing levels of overhead (for example, different ratios of reference signals to data). These patterns may be configured by a system information block (SIB), an MCCH, an RRC, or a DCI, among other examples. Different DMRS patterns may also be defined for different bandwidths (for example, 20 MHz or 100 MHz), or for different numerologies (for example, 15 kHz subcarrier spacing or 60 kHz subcarrier spacing).

In the example of FIG. 2, the UE 115-a may receive control signaling 215 from the TRPs 210. For example, the UE 115-a may receive the control signaling 215 from the TRP 210-a, the TRP 210-b, or the TRP 210-c. The TRPs 210 may be synchronized and may appear to the UE 115-a as a single transmitter. The control signaling 215 may indicate a set of resources associated with a set of reference signal patterns. The UE 115-a may receive reference signals 220 (for example, DMRSs, TRSs) from the TRPs 210 based on the control signaling 215. For example, the UE 115-a may receive the reference signals 220 from the TRP 210-a, the TRP 210-b, or the TRP 210-c. The UE 115-a may receive the reference signals 220 over a multi-path channel (for example, a wide-area channel) associated with a relatively large delay spread.

The UE 115-a may perform a channel estimation procedure associated with the multi-path channel based on receiving the reference signals 220. For example, the UE 115-a may generate a set of channel statistics (for example, a PDP), a filtering operator, or a set of channel estimates, as described with reference to FIGS. 7 and 8. The UE 115-a may receive a data transmission 225 (for example, an MBMS transmission, a wide-area terrestrial broadcast transmission) from the TRPs 210 over the multi-path channel, and may decode the data transmission 225 based on the set of channel statistics, the filtering operator, or the set of channel estimates. In some examples, the data transmission 225 may be multiplexed (for example, in the time-domain) with the reference signals 220. For example, the data transmission 225 may be interlaced with the reference signals 220. Operations employed by the UE 115-a and the TRPs 210 may enable the UE 115-a to perform channel estimation with greater accuracy and lower signaling overhead, among other benefits.

Figure 3:
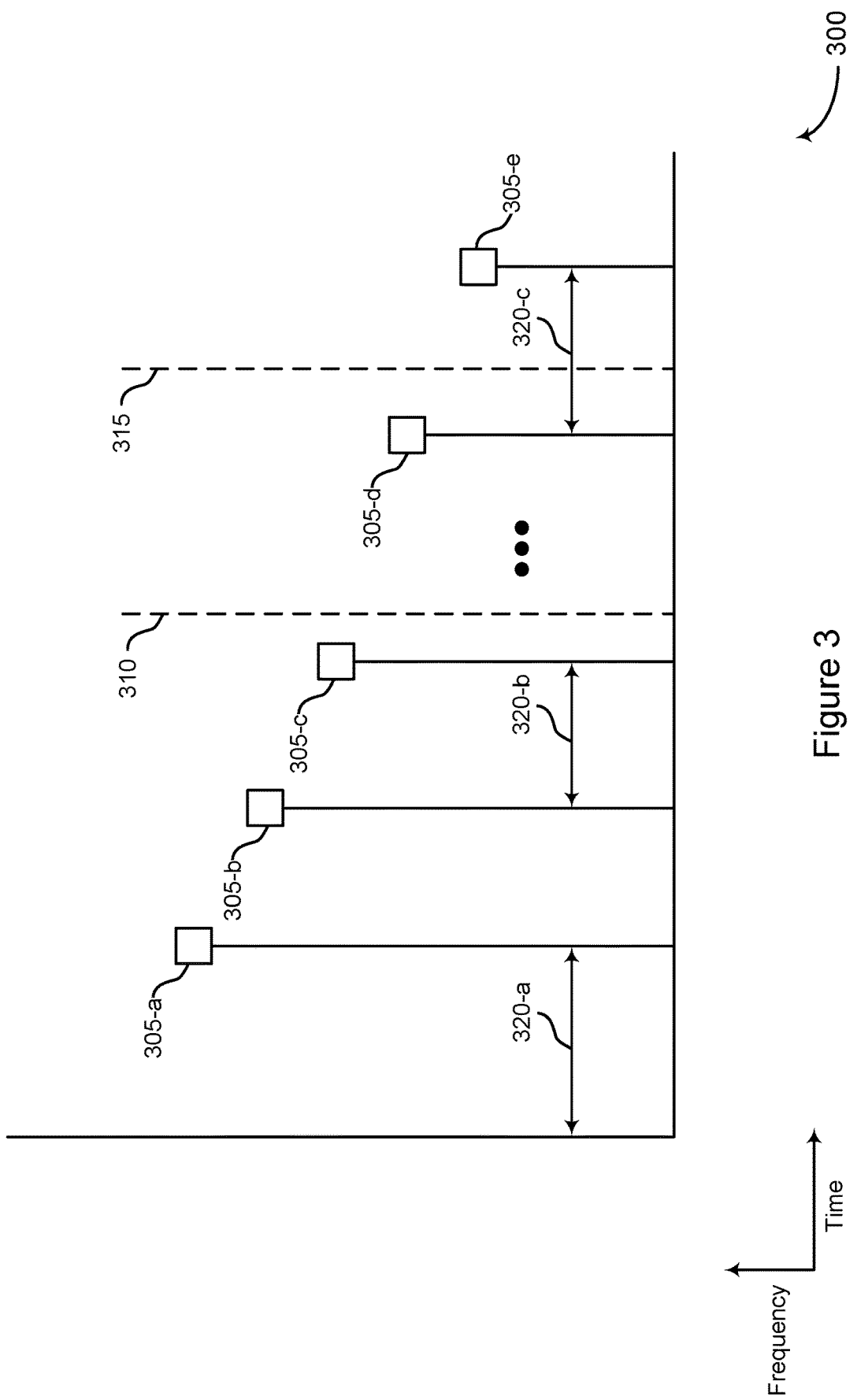
FIG. 3 illustrates an example of a channel response function that supports reference signal patterns for multi-path channel estimation in accordance with aspects of the present disclosure.

FIG. 3 illustrates an example of a channel response function 300 that supports reference signal patterns for multi-path channel estimation in accordance with aspects of the present disclosure. The channel response function 300 may implement or be implemented by aspects of the wireless communications system 100 or the wireless communications system 200. For example, the channel response function 300 may implement or be implemented by a UE 115, a base station 105, or a TRP (for example, an access network transmission entity 145), which may be examples of corresponding devices described with reference to FIGS. 1 and 2. The channel response function 300 may illustrate a CIR for a multi-path broadcast channel.

In the example of FIG. 3, a UE 115 may receive transmissions from a set of TRPs over a multi-path channel. These transmissions may arrive at the UE 115 at different times based on an ISD between the set of TRPs. These transmissions may result in a specific CIR at the UE 115. This CIR may include taps 305, which may be equivalently referred to herein as channel taps, delay taps, or channel impulses. Each TRP may correspond to a cluster of taps 305. For example, a tap 305-a may correspond to a transmission from a first TRP, a tap 305-b may correspond to a transmission from a second TRP, a tap 305-c may correspond to a third TRP, a tap 305-d may correspond to a transmission from a fourth TRP, and a tap 305-e may correspond to a transmission from a fifth TRP.

In some cases, the multi-path channel may be associated with time-domain sparsity. For example, there may be time gaps 320 between the taps 305, resulting in a sparse delay-domain channel profile at the UE 115. Specifically, there may be a time gap 320-a prior to the tap 305-a, a time gap 320-b between the tap 305-b and the tap 305-c, and a time gap 320-c between the tap 305-d and the tap 305-d. Due to these time gaps 320, some of the taps 305 (for example, the tap 305-d and the tap 305-e) may be outside of a cyclic prefix duration 310 configured for the UE 115. In addition, some of the taps 305 (for example, the tap 305-e) may be outside of an EI 315 of a reference signal pattern that uniformly samples the multi-path channel in frequency, which may be equivalent to the reciprocal of a frequency spacing associated with the reference signal transmissions from the TRPs (for example, when uniform reference signal patterns are used).

For cases in which some of the taps 305 are outside of the EI 315 of a uniform reference signal pattern, the UE 115 may experience aliasing between the taps 305. For example, the tap 305-e may cause aliasing issues with other taps 305, which may decrease the likelihood of the UE 115 successfully determining correct locations of the taps 305 in a time-domain channel estimate. Aspects of the present disclosure may enable the UE 115 to mitigate this aliasing issue based on using a filtering operator (for example, an alias-correcting operator) in conjunction with a non-uniform DMRS pattern design (for example, the interlaced reference signal pattern illustrated in the resource mapping 500) to identify aliased taps. Using the filtering operator in conjunction with these non-uniform DMRS patterns to identify aliased taps may enable the UE 115 to perform channel estimation with greater accuracy, which may increase the likelihood of the UE 115 successfully receiving transmissions over the multi-path channel, among other benefits.

FIGS. 4A and 4B illustrate examples of a resource mapping 400 and a resource mapping 401 that support reference signal patterns for multi-path channel estimation in accordance with aspects of the present disclosure. The resource mapping 400 and the resource mapping 401 may implement or be implemented by aspects of the wireless communications system 100 or the wireless communications system 200. For example, the resource mapping 400 and the resource mapping 401 may implement or be implemented by a UE 115, a base station 105, or a TRP (for example, an access network transmission entity 145), which may be examples of corresponding devices described with reference to FIGS. 1 and 2. The resource mapping 400 and the resource mapping 401 may illustrate examples of reference signal patterns, which may be defined with respect to subcarriers 405 and symbols 410.

In the example of FIG. 4A, a UE 115 may receive reference signals (for example, DMRSs) on resources associated with a non-staggered reference signal pattern. The non-staggered reference signal pattern illustrated in FIG. 4A may have a symbol spacing (for example, $T_d$) of 1. However, alternative symbol spacings may also be used. The non-staggered reference signal pattern may include a number of symbols 410 and a number of subcarriers 405 corresponding to each of the symbols 410. The subcarriers 405 may be configured as a block of 17 subcarriers with indices ranging from 0 to 16.

The non-staggered reference signal pattern may include a symbol 410-a, a symbol 410-b, a symbol 410-c, a symbol 410-d, and a symbol 410-e. For each of the symbols 410, the non-staggered reference signal pattern may include a subcarrier 405-a with a subcarrier index of 0, a subcarrier 405-b with a subcarrier index of 2, a subcarrier 405-c with a subcarrier index of 7, a subcarrier 405-d with a subcarrier index of 12, and a subcarrier 405-e with a subcarrier index of 15. The subcarrier indices associated with the subcarriers 405 of the non-staggered reference signal pattern may be configured to provide lower coherence in comparison to other uniform patterns. The non-staggered reference signal pattern may have a coherence that is relatively close to Welch-bound achieving patterns (for example, with respect to compressed sensing theory) among all index patterns with similar signaling overhead, which may enable the UE 115 to perform channel estimation over sparse channels with greater accuracy.

In the example of FIG. 4B, the UE 115 may receive reference signals (for example, DMRSs) on reference signals associated with a time-staggered reference signal pattern. The time-staggered reference signal pattern illustrated in FIG. 4B may have a symbol spacing (for example, $T_d$) of 5, such that the reference signals may be staggered across 5 symbols. The time-staggered reference signal pattern may include a number of symbols 410 and a number of subcarriers 405 corresponding to the symbols 410. For example, the time-staggered reference signal pattern may include a symbol 410-f, a subcarrier 405-f corresponding to the symbol 410-f, a symbol 410-g, a subcarrier 405-g corresponding to the symbol 410-g, a symbol 410-h, a subcarrier 405-h corresponding to the symbol 410-h, a symbol 410-i, a subcarrier 405-i corresponding to the symbol 410-i, a symbol 410-j, and a subcarrier 405-j corresponding to the symbol 410-j.

The subcarrier 405-f may be associated with a subcarrier index of 0, the subcarrier 405-g may be associated with a subcarrier index of 2, the subcarrier 405-h may be associated with a subcarrier index of 7, the subcarrier 405-i may be associated with a subcarrier index of 12, and the subcarrier 405-j may be associated with a subcarrier index of 15. Similarly, the symbol 410-f may be associated with a symbol index of 0, the symbol 410-g may be associated with a symbol index of 1, the symbol 410-h may be associated with a symbol index of 2, the symbol 410-i may be associated with a symbol index of 3, and the symbol 410-j may be associated with a symbol index of 4. In comparison to the non-staggered reference signal pattern illustrated in FIG. 4A, the time-staggered reference signal pattern illustrated in FIG. 4B may be staggered over 5 symbols. The reference signal patterns illustrated by the resource mapping 400 and the resource mapping 401 may be associated with lower signaling overhead and lower coherence, which may enable the UE 115 to perform channel estimation with higher accuracy and greater efficiency, among other benefits.

Figure 5:
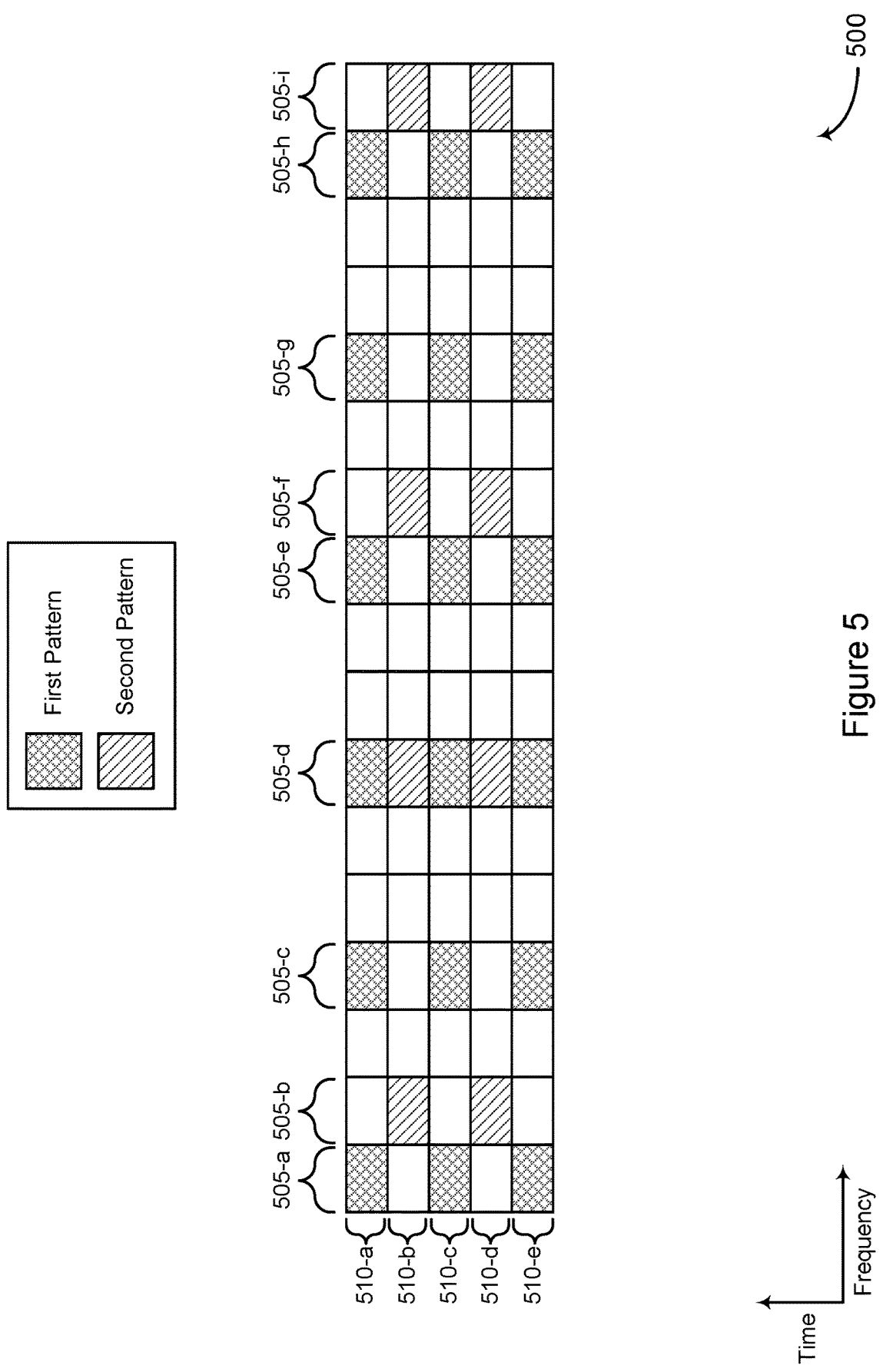
FIG. 5 illustrates an example of a resource mapping that supports reference signal patterns for multi-path channel estimation in accordance with aspects of the present disclosure.

FIG. 5 illustrates an example of a resource mapping 500 that supports reference signal patterns for multi-path channel estimation in accordance with aspects of the present disclosure. The resource mapping 500 may implement or be implemented by aspects of the wireless communications system 100 or the wireless communications system 200. For example, the resource mapping 500 may implement or be implemented by a UE 115, a base station 105, or a TRP (for example, an access network transmission entity 145), which may be examples of corresponding devices described with reference to FIGS. 1 and 2. The resource mapping 500 may illustrate an example of a reference signal pattern, which may be defined with respect to subcarriers 505 and symbols 510.

The resource mapping 500 may illustrate a composite reference signal pattern that includes two regular patterns (for example, sub-patterns) interlaced with each other in frequency. These patterns may or may not be staggered across multiple OFDM symbols. The composite reference signal pattern may include DMRSs from a first pattern with a first frequency spacing and DMRSs from a second pattern with a second frequency spacing. The composite of the first pattern and the second pattern may form a resultant DMRS pattern, which may have low coherence properties (for example, with respect to compressed sensing), and may enable efficient sparse channel estimation. Although illustrated with two constituent sub-patterns, the composite reference signal pattern may include any number of constituent sub-patterns.

Interlaced regular patterns may include a union of uniform patterns with corresponding DMRS spacings and initial subcarrier offsets. To recover channel taps with reduced residual aliasing, the DMRS spacings may be co-prime among each other. In some examples, all of the DMRS spacings may be mutually co-prime (for example, a greatest common divisor (GCD) of all the DMRS spacings may be equal to 1). In other examples, any number of pairwise DMRS spacings may be co-prime (for example, a GCD of any two DMRS spacings may be equal to 1). This may ensure that no channel tap is aliased simultaneously in all constituent sub-patterns. Additionally, the DMRS spacings may divide a number of data subcarriers. The patterns may continue uninterrupted throughout a relatively large bandwidth, and may not defined with respect to PRBs. The composite effect of these sub-patterns may enable a UE 115 to estimate a wideband channel with various channel estimation algorithms, as described with reference to FIGS. 7 and 8. These DMRS patterns may enable FFT-based processing for channel estimation.

For cases in which multi-antenna transmission is employed, a UE 115 may be able to identify reference signals transmitted from each antenna independently. For such cases, compressed-sensing property-preserving patterns may be extended to multi-antenna transmissions. For cases in which reference signal patterns are staggered over at least two symbols, an antenna-port specific symbol-level orthogonal cover code may be applied over the reference signal tone complex baseband signals. In some cases, the cover code may be specific to an antenna port. Additionally or alternatively, the cover code may span multiple OFDM symbols. For cases in which a two antenna transmitter is used to transmit a two symbol DMRS pattern, the DMRSs for a first antenna port may be multiplied by a first cover code (for example, [1, 1]) over two symbols, while DMRSs for a second antenna port may be multiplied by a second cover code (for example, [1,−1]). Alternatively, an interlaced regular pattern or a combinatorial object (for example, based on difference-sets) may be derived using a base unit equal to a number of antennas, and elements of the base unit may include contiguous subcarriers. For interlaced regular patterns, a regular sub-pattern may be a vector of subcarriers with a size that corresponds to a number of antennas.

For cases in which patterns are defined based on specific combinatorial constructions, some patterns may be applicable for a number of subcarriers (for example, 3936 subcarriers), while other patterns may not be applicable for other numbers of subcarriers supported in LTE or NR (for example, 3600 subcarriers) in a specific bandwidth. To mitigate this issue, a number of guard subcarriers on either side of the data subcarrier region in a specific bandwidth may be adjusted. This may distinguish these patterns from eMBB and URLLC, among other examples.

In the example of FIG. 5, a UE 115 may receive reference signals (for example, DMRSs) on a set of resources associated with an interlaced reference signal pattern. The interlaced reference signal pattern may include a first pattern and a second pattern. Likewise, the set of resources may include a first set of resources associated with the first pattern and a second set of resources associated with the second pattern. The first set of resources may include a symbol 510-a, a symbol 510-c, a symbol 510-e, a subcarrier 505-a, a subcarrier 505-c, a subcarrier 505-d, a subcarrier 505-e, a subcarrier 505-g, and a subcarrier 505-c. Similarly, the second set of resources may include a symbol 510-b, a symbol 510-d, a subcarrier 505-b, the subcarrier 505-d, a subcarrier 505-f, and a subcarrier 505-i. The first pattern may be associated with a first frequency spacing (for example, $F_d$=3), while the second pattern may be associated with a second frequency spacing (for example, $F_d$=5). The composite (for example, interlaced) pattern may have a time-stagger parameter (for example, $T_d$=2 OFDM symbols), which may indicate a number of symbols over which the composite pattern is staggered. In the example of FIG. 5, the composite pattern is staggered over 2 OFDM symbols. The interlaced reference signal pattern may be associated with relatively low coherence properties (for example, in the context of compressed sensing), which may enable the UE 115 to perform sparse channel estimation with higher accuracy.

Figure 6A:
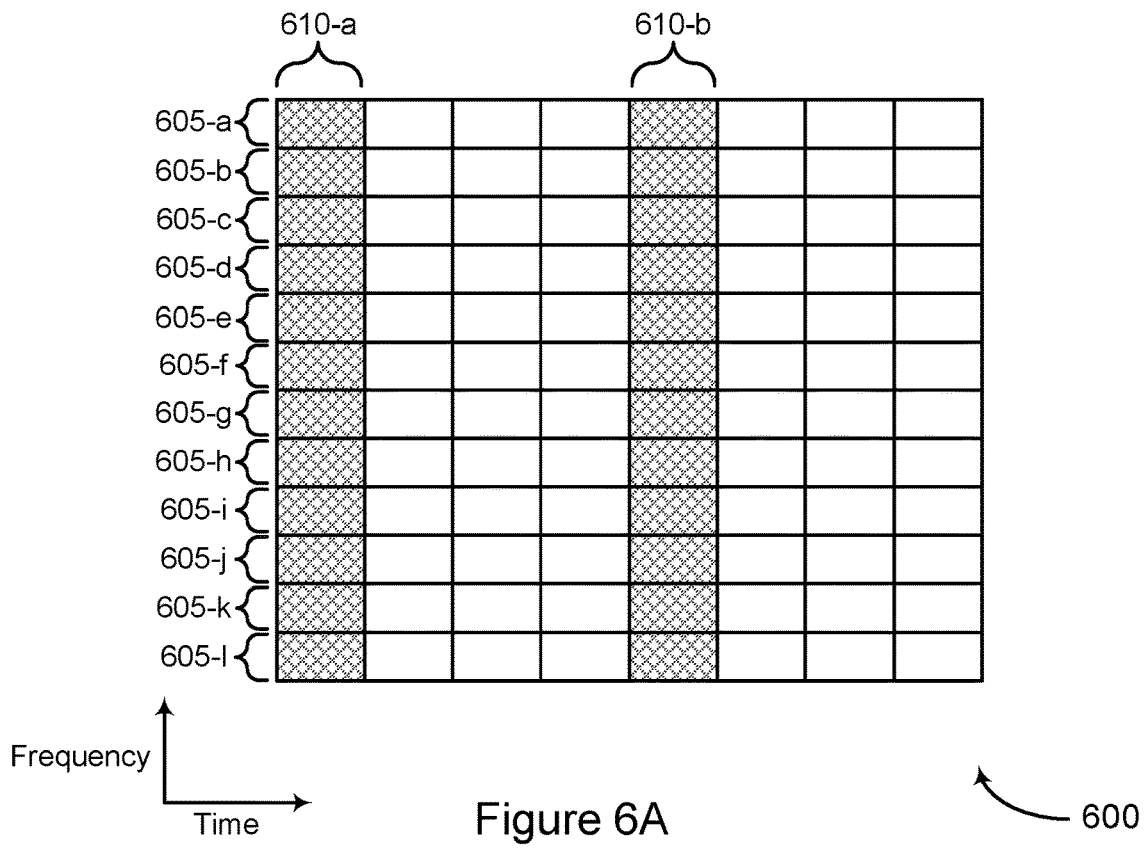
FIGS. 6A and 6B illustrate examples of resource mappings that support reference signal patterns for multi-path channel estimation in accordance with aspects of the present disclosure.
Figure 6B:
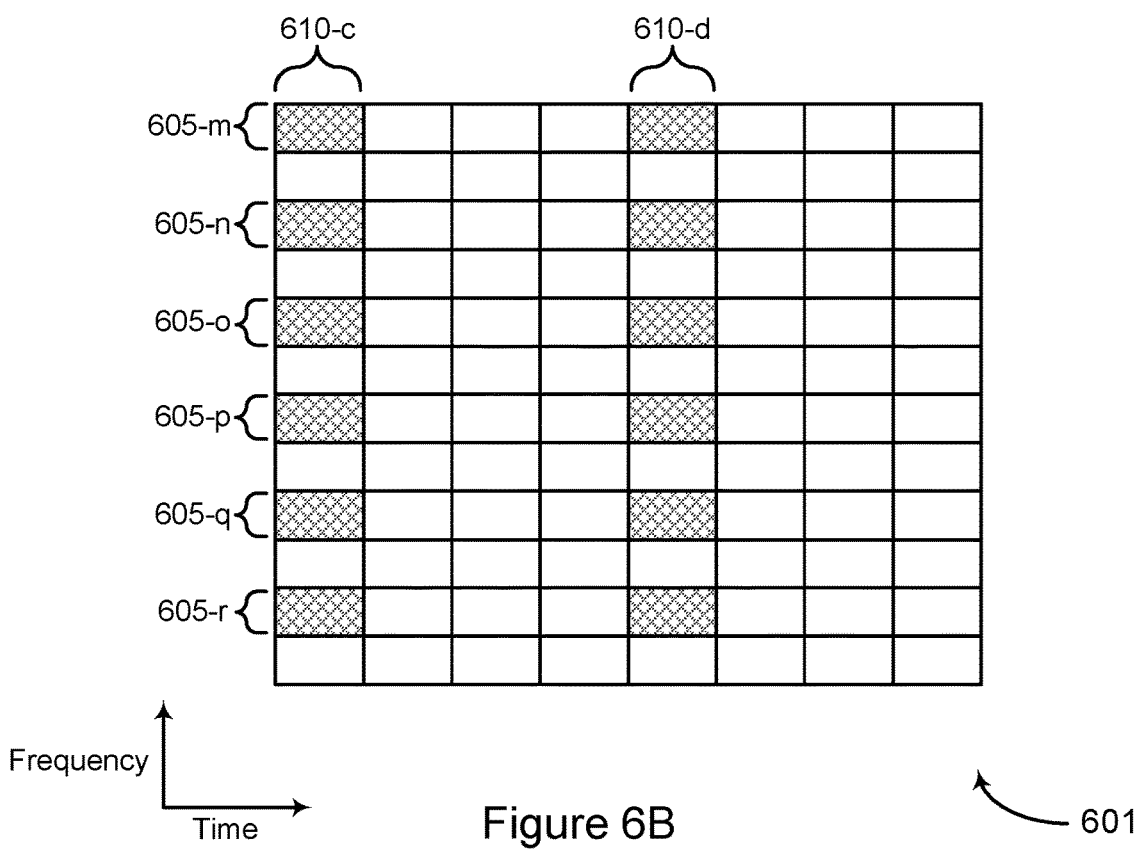

FIGS. 6A and 6B illustrate examples of a resource mapping 600 and a resource mapping 601 that support reference signal patterns for multi-path channel estimation in accordance with aspects of the present disclosure. The resource mapping 600 and the resource mapping 601 may implement or be implemented by aspects of the wireless communications system 100 or the wireless communications system 200. For example, the resource mapping 600 and the resource mapping 601 may implement or be implemented by a UE 115, a base station 105, or a TRP (for example, an access network transmission entity 145), which may be examples of corresponding devices described with reference to FIGS. 1 and 2. The resource mapping 600 and the resource mapping 601 may illustrate examples of reference signal patterns, which may be defined with respect to subcarriers 605 and symbols 610.

The reference signal patterns illustrated in the resource mapping 600 and the resource mapping 601 may be examples of broadcast TRS patterns that are relatively dense in the frequency-domain and relatively sparse in the time-domain. A set of TRS patterns may be defined that are specific to wide-area terrestrial broadcast (for example, MBMS) that differ in time or frequency characteristics from TRS candidates used for eMBB and URLLC, which may not be associated with such large delay spread channels. As a TRS may be defined as a CSI-RS resource with a parameter (for example, trs-Info) set, specific CSI-RS resources may be defined to support these TRS patterns. These TRS patterns may have a denser spacing in frequency. In some cases, the TRS patterns may span every subcarrier of a symbol, and may have a different (for example, sparser) periodicity in time. In some examples, this may be applicable for high-power or high-tower networks (for example, rooftop receivers) with slow fading (for example, low-variability) channels.

In some examples, a TRS may be configured as a QCL source for MBMS. For dynamic scheduling in NR, a QCL source indication for a data transmission (for example, a PDSCH) may be indicated to the UE 115 via a defined process that includes an RRC configuration, a MAC-CE activation for a set of transmission configuration indicator (TCI) states, and a DCI field selecting one of the activated TCI states. For wide-area broadcast applications (for example, MBSFN), a UE may receive an MBMS broadcast data service based on receiving a SIB that includes semi-static configuration information for the MBMS service (for example, MBSFNAreaInfo), which may provide the UE 115 with basic information associated with reception of broadcast control (for example, MCCH) channels. The UE 115 may receive the MCCH, which may schedule a set of broadcast data channels (for example, MTCH). In some cases, MTCH scheduling may not use DCI. As a result, the semi-static configuration for the MBMS service (for example, in SIB) may directly indicate a TRS resource QCL-ed with the MBSFN area or service. The TRS resource (for example, a time or frequency pattern) used may depend on a DMRS pattern used for the MBSFN area or service. Because accurate PDP estimation may be a prerequisite for using the compressed-sensing-based DMRS patterns described herein, these TRS patterns and QCL sources may be configured in conjunction with such DMRS patterns.

In the example of FIG. 6A, a UE 115 may receive reference signals (for example, TRSs) on a set of resources (for example, CSI-RS resources). The set of resources may include symbols 610 and subcarriers 605 corresponding to each of the symbols 610. For example, the set of resources may include a symbol 610-*a* and a symbol 610-*b*. Each of the symbols 610 in the set of resources may have corresponding subcarriers 605, which may include a subcarrier 605-*a*, a subcarrier 605-*b*, a subcarrier 605-*c*, a subcarrier 605-*d*, a subcarrier 605-*e*, a subcarrier 605-*f*, a subcarrier 605-*g*, a subcarrier 605-*h*, a subcarrier 605-*i*, a subcarrier 605-*j*, a subcarrier 605-*k*, and a subcarrier 605-1. In some examples, the subcarriers 605 in the TRS pattern may span each subcarrier in a defined frequency range.

In the example of FIG. 6B, the UE 115 may receive reference signals (for example, TRSs) on a set of resources (for example, CSI-RS resources). The set of resources may include symbols 610 and subcarriers 605 corresponding to each of the symbols 610. For example, the set of resources may include a symbol 610-*c* and a symbol 610-*d*. Each of the symbols 610 in the set of resources may have corresponding subcarriers 605, which may include a subcarrier 605-*m*, a subcarrier 605-*n*, a subcarrier 605-*o*, a subcarrier 605-*p*, a subcarrier 605-*q*, and a subcarrier 605-*r*. In some examples, the subcarriers 605 in the TRS pattern may span every other subcarrier in a defined frequency range. The TRS patterns illustrated by the resource mapping 600 and the resource mapping 601 may enable the UE 115 to estimate various channel statistics (for example, PDP) with greater accuracy, which may improve channel estimation procedures performed by the UE 115.

Figure 7:
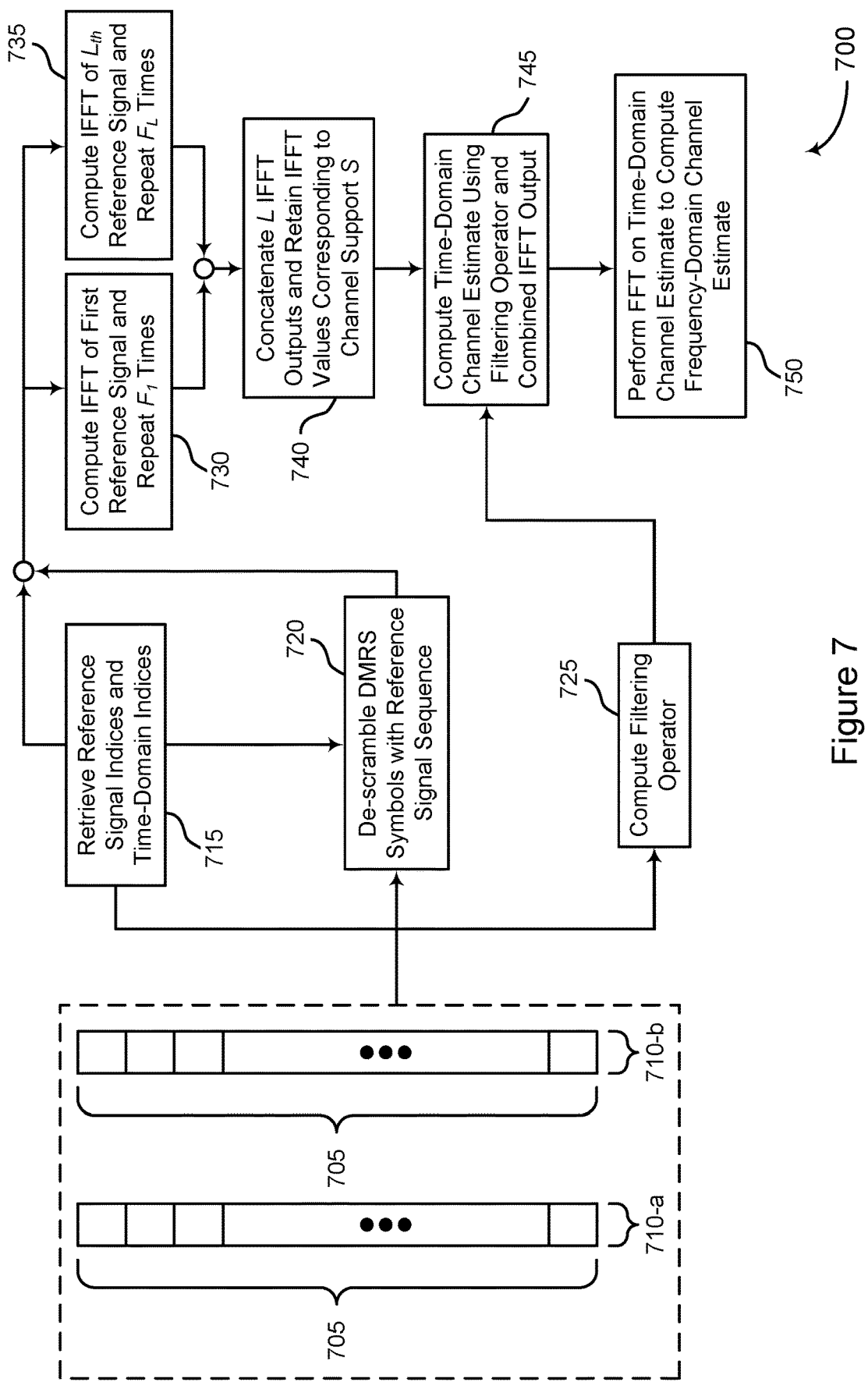
FIGS. 7 and 8 illustrate examples of channel estimation procedures that support reference signal patterns for multi-path channel estimation in accordance with aspects of the present disclosure.

FIG. 7 illustrates an example of a channel estimation procedure 700 that supports reference signal patterns for multi-path channel estimation in accordance with aspects of the present disclosure. The channel estimation procedure 700 may implement or be implemented by aspects of the wireless communications system 100 or the wireless communications system 200. For example, the channel estimation procedure 700 may implement or be implemented by a UE 115, a base station 105, or a TRP (for example, an access network transmission entity 145), which may be examples of corresponding devices described with reference to FIGS. 1 and 2. The channel estimation procedure 700 may support channel estimation techniques using interlaced regular patterns, among other regular reference signal patterns.

Various algorithms can be used for channel estimation. For example, a Least Squares (LS) estimation can be performed using an Inverse Fast Fourier Transform (IFFT) algorithm. In some cases, LS estimation can be performed without statistics of the channel. In such cases, LS information can be performed using channel support information. Conjugate Gradient (CG)-based estimation can also be used instead of matrix inversion. Alternatively, a frequency-domain MMSE estimation can be used for channel estimation. A frequency-domain MMSE may be associated with higher complexity in comparison to an LS estimation, and may be suitable for relatively small bandwidths.

In other cases, a combination of LS with delay-domain MMSE (for example, diagonal) compensation can be used for channel estimation. This approach may involve LS estimation (for example, IFFT) in addition to an element-wise correction term that corresponds to a delay tap average power and noise level. LS estimation for reference signal patterns may not be performed using FFT or IFFT-based algorithm, as the compressed sensing-based composite reference signal patterns described herein may not uniformly sample the channel frequency response. Some receiver architectures may support interlaced regular patterns. These receivers may employ a time-domain (for example, delay-domain) aliasing-correcting filter, which may be equivalently referred to herein as an anti-aliasing filter, a filtering operator, or an alias-correcting operator, among other examples.

In the example of FIG. 7, a UE 115 may receive reference signals (for example, DMRSs) on a set of resources in accordance with an interlaced (for example, composite) DMRS pattern, as described with reference to FIG. 5. For example, the UE 115 may receive the reference signals on subcarriers 705, which may be associated with a non-uniform frequency spacing. In some examples, the interlaced DMRS pattern may be staggered over multiple symbols 710. As illustrated in FIG. 7, the reference signals may be staggered across a symbol 710-*a* and a symbol 710-*b*. For cases in which the reference signals are staggered across symbols 710, the UE 115 may collate (for example, de-stagger) the reference signals at a receiver of the UE 115. At 715, the UE 115 may collate the reference signals based on determining a set of time-domain indices corresponding to a channel support parameter S of a multi-path channel over which the UE 115 received the reference signals.

At 720, the UE 115 may de-scramble the symbols 710 using a defined reference signal sequence, and may generate a set of values (for example, $r_p$). At 725, the UE 115 may compute a filtering operator (for example, for an LS-based estimation, $W=(F_{\Omega,S}{}^*F_{\Omega,S})^{-1}$, in which $\Omega$ corresponds to a DMRS pattern, S corresponds to a support set of the time-domain channel, F represents a DFT matrix, and the subscripts $\Omega$ and S indicate row and column indices corresponding to $\Omega$ and S that are retained in F) based on the reference signal indices and time-domain indices retrieved at 715. At 730, the UE 115 may compute an IFFT (for example, an $N_{p,1}$-point IFFT, in which $N_{p,1}$ corresponds to a number of tones in a first sub-pattern of the composite reference signal pattern) corresponding to a first uniform sub-pattern of the composite reference signal pattern, and may repeat the IFFT output a number of times to obtain a first IFFT value (for example, $r_{p,1}$). At 735, the UE 115 may compute an IFFT (for example, an $N_{p,L}$-point IFFT) corresponding to an Lai uniform sub-pattern of the composite reference signal pattern, and may repeat the IFFT output for a number of times (for example, $F_L$ times) to obtain an $L_{th}$ IFFT value (for example, $r_{p,L}$).

At 740, the UE 115 may combine (for example, concatenate) a number of IFFT values, and may retain IFFT values corresponding to the channel support parameter S (for example, $r_{p,td}=[[r_{p,1}{}^T]_S,[r_{p,2}{}^T]_S, \ldots, [r_{p,L}{}^T]_S]^T)$. At 745, the UE 115 may apply the aliasing-correcting filter to the combined IFFT value such that the UE 115 can obtain a time-domain channel estimate (for example, $\widehat{H_{td}}=Wr_{p,td}$). At 750, the UE 115 may compute an FFT of the time-domain channel estimate to obtain a frequency-domain channel estimate (for example, $\hat{H}$). The channel estimation procedure 700 may enable the UE 115 to perform channel estimation with greater accuracy and lower signaling overhead, among other benefits.

Figure 8:
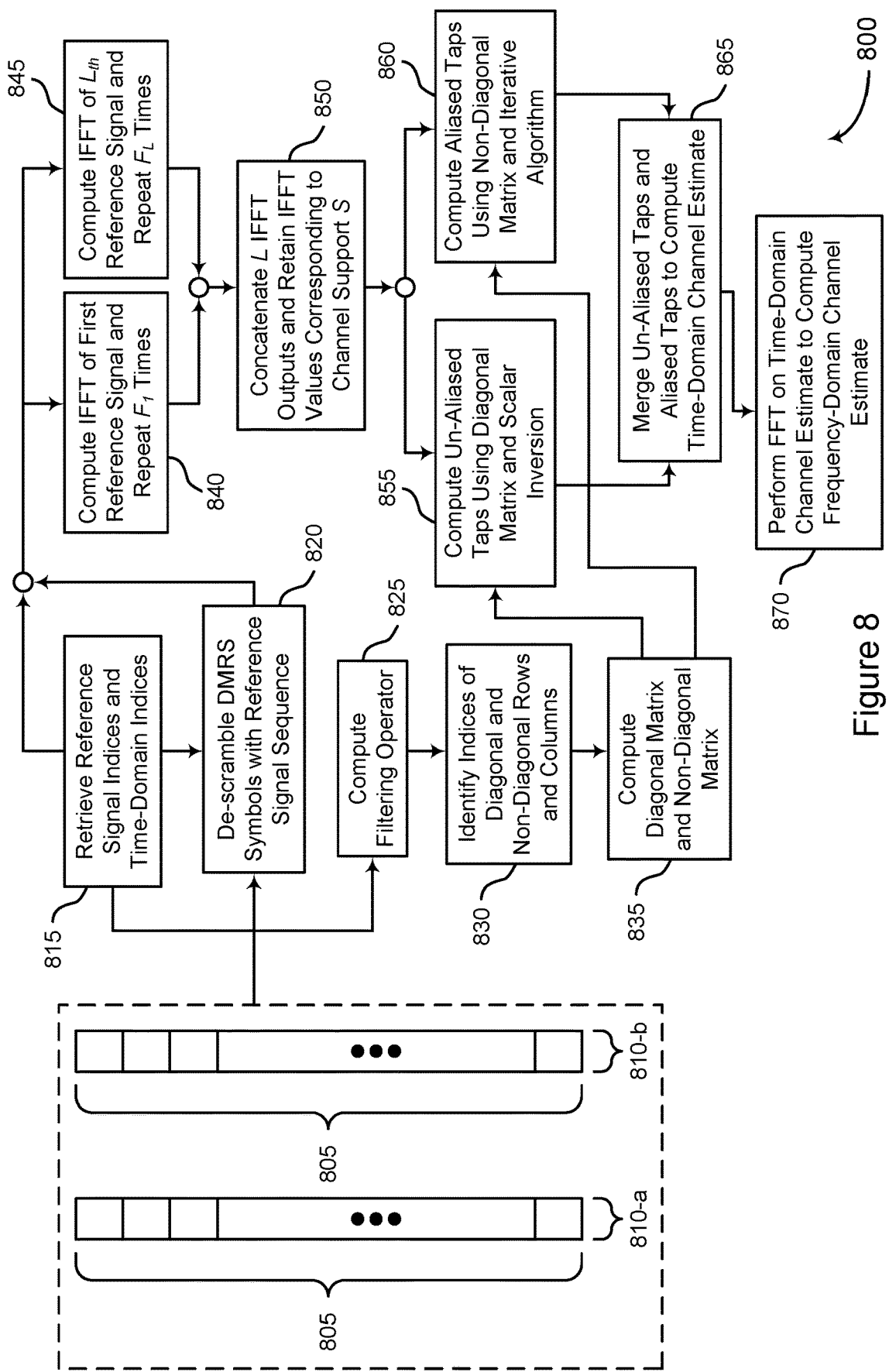

FIG. 8 illustrates an example of a channel estimation procedure 800 that supports reference signal patterns for multi-path channel estimation in accordance with aspects of the present disclosure. The channel estimation procedure 800 may implement or be implemented by aspects of the wireless communications system 100 or the wireless communications system 200. For example, the channel estimation procedure 800 may implement or be implemented by a UE 115, a base station 105, or a TRP (for example, an access network transmission entity 145), which may be examples of corresponding devices described with reference to FIGS. 1 and 2. The channel estimation procedure 800 may illustrate operations and techniques for performing channel estimation at a UE 115 in accordance with aspects of the present disclosure.

The example of FIG. 8 may illustrate an example of a CG-based time-domain receiver that uses channel statistics to adjust CIR amplitudes and utilizes sparsity in the aliasing-correcting filter matrix to reduce the relative complexity of performing channel estimation. In comparison to other approaches, the channel estimation procedure 800 may apply the aliasing-correcting filter matrix to the concatenated IFFT values in a different manner. For other approaches, this aliasing-correcting aspect may natively be a matrix-vector product, which may take a number of computations for a sparse channel. However, a matrix-vector product approach may not utilize the sparsity of the underlying matrices. An iterative approach (for example, CG or Gaussian Belief Propagation (BP)) may utilize the inherent sparsity and converge with fewer computations. BP is an iterative method to find approximations of maximum a-posteriori (MAP) or MMSE estimators. BP may be used for low-density parity code (LDPC) decoding operations. Gaussian BP is a specific case of BP (for example, with Gaussian underlying assumptions). For some implementations, a Gaussian BP algorithm can be utilized instead of a CG algorithm. In such examples, alias correction may be achieved using an iterative message passing algorithm. In some examples, an incomplete Cholesky preconditioning operation may be utilized in conjunction with a CG-based algorithm.

In the example of FIG. 8, a UE 115 may receive reference signals (for example, DMRSs) on a set of resources in accordance with an interlaced (for example, composite) DMRS pattern, as described with reference to FIG. 5. For example, the UE 115 may receive the reference signals on subcarriers 805, which may be associated with a non-uniform frequency spacing. In some examples, the interlaced DMRS pattern may be staggered over multiple symbols 810. As illustrated in FIG. 8, the reference signals may be staggered across a symbol 810-*a* and a symbol 810-*b*. For cases in which the reference signals are staggered across symbols 810, the UE 115 may collate (for example, de-stagger) the reference signals at a receiver of the UE 115. At 815, the UE 115 may collate the reference signals based on determining a set of time-domain indices corresponding to a channel support parameter S of a multi-path channel over which the UE 115 received the reference signals.

At 820, the UE 115 may de-scramble the symbols 810 using a defined reference signal sequence, and may generate a set of values (for example, $r_p$). At 825, the UE 115 may compute an aliasing-correcting filter (for example, $W=\text{CINR} \cdot F_{\Omega,S}{}^*F_{\Omega,S}+\Sigma_{H_{td}H_{td}}{}^{-1}$, in which CINR denotes a channel-to-interference plus noise ratio (CINR), $\Sigma_{H_{td}H_{td}}{}^{-1}$ denotes an inverse covariance matrix of a time-domain channel, $\Omega$ corresponds to a DMRS pattern, S corresponds to a support set of the time-domain channel, F represents a DFT matrix, and the subscripts $\Omega$ and S indicate row and column indices corresponding to $\Omega$ and S that are retained in F) based on the reference signal indices and time-domain indices retrieved at 815. At 830, the UE 115 may determine row and column indices (for example, D and N) from the aliasing-correcting filter that correspond to diagonal and non-diagonal rows and columns, respectively. At 835, the UE 115 may generate a diagonal matrix (for example, $W_D=[W]_{D,D}$) and a non-diagonal matrix (for example, $W_N=[W]_{N,N}$) based on the row and column indices identified at 830. At 840, the UE 115 may compute an IFFT (for example, an $N_{p,1}$-point IFFT, in which $N_{p,1}$ corresponds to a number of tones in a first sub-pattern of the composite reference signal pattern) corresponding to a first uniform sub-pattern of the composite reference signal pattern, and may repeat the IFFT output for a number of times (for example, $F_1$ times) to obtain a first IFFT value (for example, $r_{p,1}$). At 845, the UE 115 may compute an IFFT (for example, an $N_{p,L}$-point IFFT) corresponding to an Lth uniform sub-pattern of the composite reference signal pattern, and may repeat the IFFT output for a number of times (for example, $F_L$ times) to obtain an Lth IFFT value (for example, $r_{p,L}$).

At 850, the UE 115 may combine (for example, concatenate) the IFFT values, and may retain the IFFT values that correspond to the channel support parameter S (for example, $r_{p,td}=[[r_{p,1}{}^T]_S, [r_{p,2}{}^T]_S, \ldots, [r_{p,L}{}^T]_S]^T)$. At 855, the UE 115 may compute un-aliased taps using the diagonal matrix generated at 835 and a scalar inversion algorithm (for example, $[\widehat{h_{td,D}}]_i=r_{p,td}{}^i[W_D]_{i,i}{}^{-1}$). At 860, the UE 115 may compute aliased delay taps corresponding to the non-diagonal matrix generated at 835 (for example, $W_N \widehat{h_{td,N}}=r_{p,td}$) via an iterative algorithm (for example, a CG-based algorithm, a CG-based algorithm combined with a Cholesky or incomplete Cholesky preconditioning operation, a Gaussian BP-based algorithm). At 865, the UE 115 may merge the un-aliased taps generated at 855 with the aliased taps generated at 860, and may generate a time-domain channel estimate (for example, $\tilde{H}_{td}$) based on merging the un-aliased taps with the aliased taps. At 870, the UE 115 may compute an FFT for the time-domain channel estimate to generate a frequency-domain channel estimate (for example, Ĥ). The channel estimation procedure 800 may enable the UE 115 to perform channel estimation with greater accuracy and lower signaling overhead, among other benefits.

Figure 9:
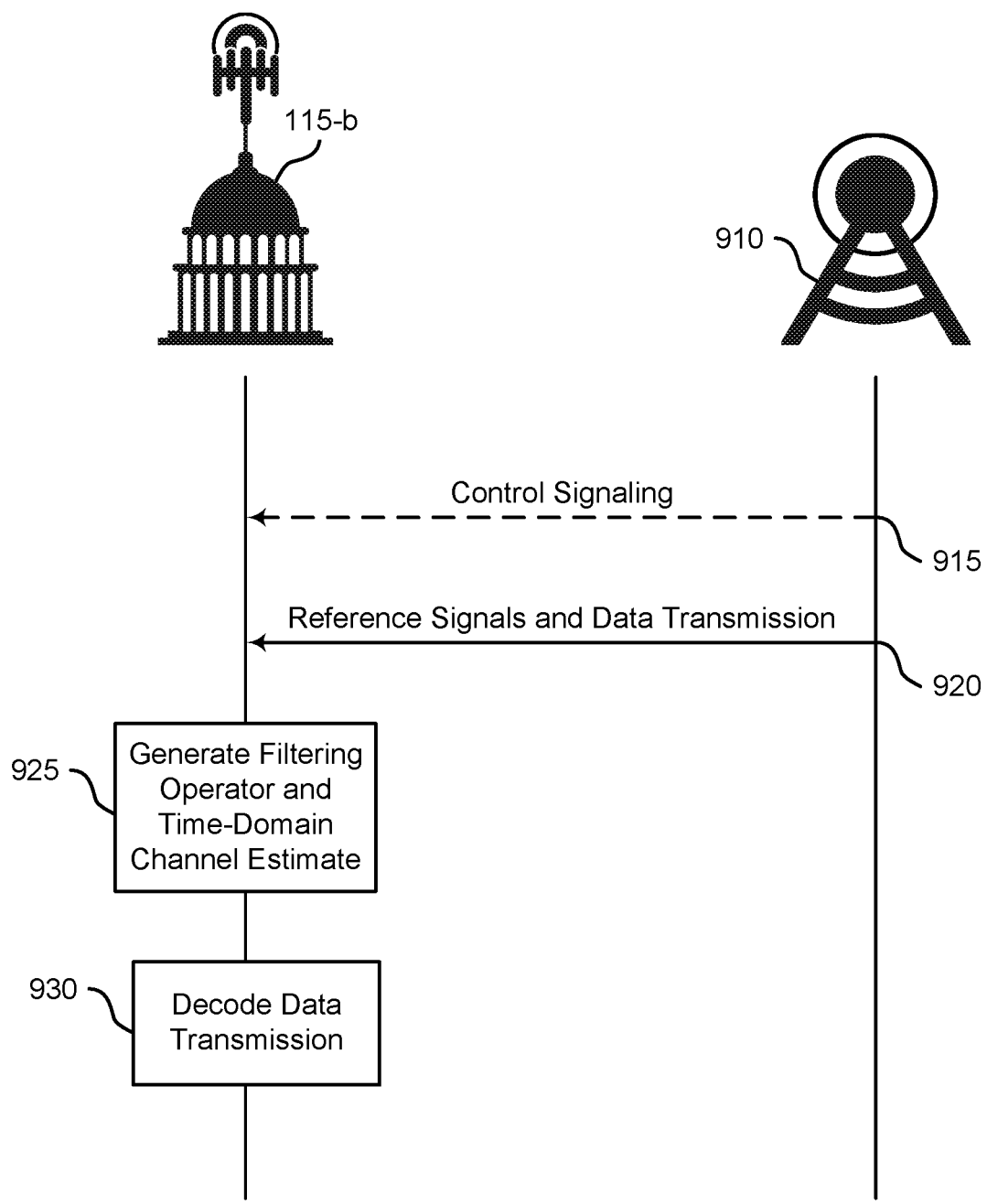
FIGS. 9 and 10 illustrate examples of process flows that support reference signal patterns for multi-path channel estimation in accordance with aspects of the present disclosure.

FIG. 9 illustrates an example of a process flow 900 that supports reference signal patterns for multi-path channel estimation in accordance with aspects of the present disclosure. The process flow 900 may implement or be implemented by aspects of the wireless communications system 100 or the wireless communications system 200. For example, the process flow 900 may include a UE 115-*b* and a TRP 910, which may be examples of corresponding devices described with reference to FIGS. 1 and 2. In the following description of the process flow 900, some operations may be omitted from the process flow 900, and other operations may be added to the process flow 900.

In some examples, the UE 115-*b* may receive control signaling from the TRP 910 at 915. The control signaling may include a SIB, an RRC message, an MCCH message, or DCI, among other examples. The control signaling may indicate a set of resources associated with a reference signal pattern (for example, an interlaced reference signal pattern described with reference to FIG. 5). The reference signal pattern may be associated with a non-uniform frequency spacing. The reference signal pattern may include multiple constituent uniform sub-patterns, and the set of resources associated with the reference signal pattern may include multiple sets of resources corresponding to the multiple constituent uniform sub-patterns. In some examples, the reference signal pattern may be specific to a bandwidth or a subcarrier spacing.

The reference signal pattern may also be associated with a power-boosting scheme, a set of logical channels (for example, a MTCH), or a set of time-domain characteristics (for example, a sparse time-domain CIR). The reference signal pattern may be defined with respect to a non-physical resource block (PRB) base unit. For example, the reference signal pattern may be defined with respect to a system bandwidth, a frequency-domain resource allocation for a data transmission, or a periodicity corresponding to a subcarrier spacing of a constituent uniform sub-pattern of the reference signal pattern. In some examples, the set of resources associated with the reference signal pattern may include multiple sets of subcarrier indices, each of which may be associated with a respective uniform frequency spacing. In some examples, the respective uniform frequency spacings may be indivisible by (for example, co-prime with) each other. In some examples, the set of resources may be staggered across multiple OFDM symbols.

At 920, the UE 115-*b* may receive a set of reference signals over a multi-path (for example, wide-area) channel on the set of resources indicated by the control signaling. The non-uniform frequency spacing associated with the set of resources may result in a row-sampled DFT matrix associated with the reference signal pattern having a lower coherence than other row-sampled DFT matrices associated with reference signal patterns that have uniform frequency spacings. The UE 115-*b* may receive the set of reference signals from a set of transmitting devices including the TRP 910. The set of transmitting devices may be associated with an SFN. The set of resources or the multiple constituent reference signal patterns may correspond to a quantity of antenna ports associated with transmission of the set of reference signals. Each of these antenna ports may be associated with an orthogonal cover code across multiple OFDM symbols.

The UE 115-*b* may also receive a data transmission (for example, a wide-area broadcast transmission or an MBMS transmission) from the set of transmitting devices over the multi-path channel. In some examples, the data transmission may be associated with a quantity of guard subcarriers that is specific to the reference signal pattern. Additionally or alternatively, a total quantity of data subcarriers associated with the data transmission may be divisible by each of the respective uniform frequency spacings associated with the constituent sub-patterns of the reference signal pattern. The data transmission may be multiplexed with the set of reference signals. For example, the UE 115-*b* may receive both the set of reference signals and the data transmission on the set of resources indicated by the control signaling.

At 925, the UE 115-*b* may generate a filtering operator associated with the received set of reference signals as well as a time-domain channel estimate associated with the multi-path channel. The UE 115-*b* may generate the filtering operator based on a set of reference signal indices associated with the received set of reference signals, a set of time-domain indices associated with the multi-path channel (for example, a channel support parameter of the multi-path channel), or a DFT matrix that includes rows or columns corresponding to the set of reference signal indices or the set of time-domain indices. The UE 115-*b* may also generate a set of IFFT values based on performing an IFFT operation on the received set of reference signals. The set of IFFT values may correspond to the set of time-domain indices associated with the multi-path channel. In some examples, the UE 115-*b* may generate the time-domain channel estimate based on applying the filtering operator to the generated set of IFFT values.

The UE 115-*b* may generate a first portion of the time-domain channel estimate based on the set of IFFT values, a diagonal component of the filtering operator, or a scalar inversion algorithm. The UE 115-*b* may generate a second portion of the time-domain channel estimate based on the set of IFFT values, the filtering operator, a non-diagonal component of the filtering operator, or an iterative algorithm (for example, a CG-based algorithm, a Gaussian BP-based algorithm, an incomplete Cholesky preconditioning operation). The UE 115-*b* may combine the first portion of the time-domain channel estimate with the second portion of the time-domain channel estimate. The UE 115-*b* may combine IFFT values from the set of IFFT values that correspond to a channel support parameter of the multi-path channel (for example, positions at which time-domain channel coefficients of the multi-path channel are non-zero). The UE 115-*b* may generate a frequency-domain channel estimate of the multi-path channel based on performing an FFT operation on the time-domain channel estimate.

At 930, the UE 115-*b* may decode the data transmission based on the filtering operator, the time-domain channel estimate, or the frequency-domain channel estimate. The process flow 900 may support techniques for improved channel estimation at the UE 115-*b*. For example, the described techniques may enable the UE 115-*b* to perform a channel estimation procedure with lower signaling overhead based on reducing a number of resources that the UE 115-*b* is configured to monitor. The described techniques may also result in lower coherence between reference signals received by the UE 115-b, which may enable the UE 115-b to perform channel estimation with greater accuracy, among other benefits.

Figure 10:
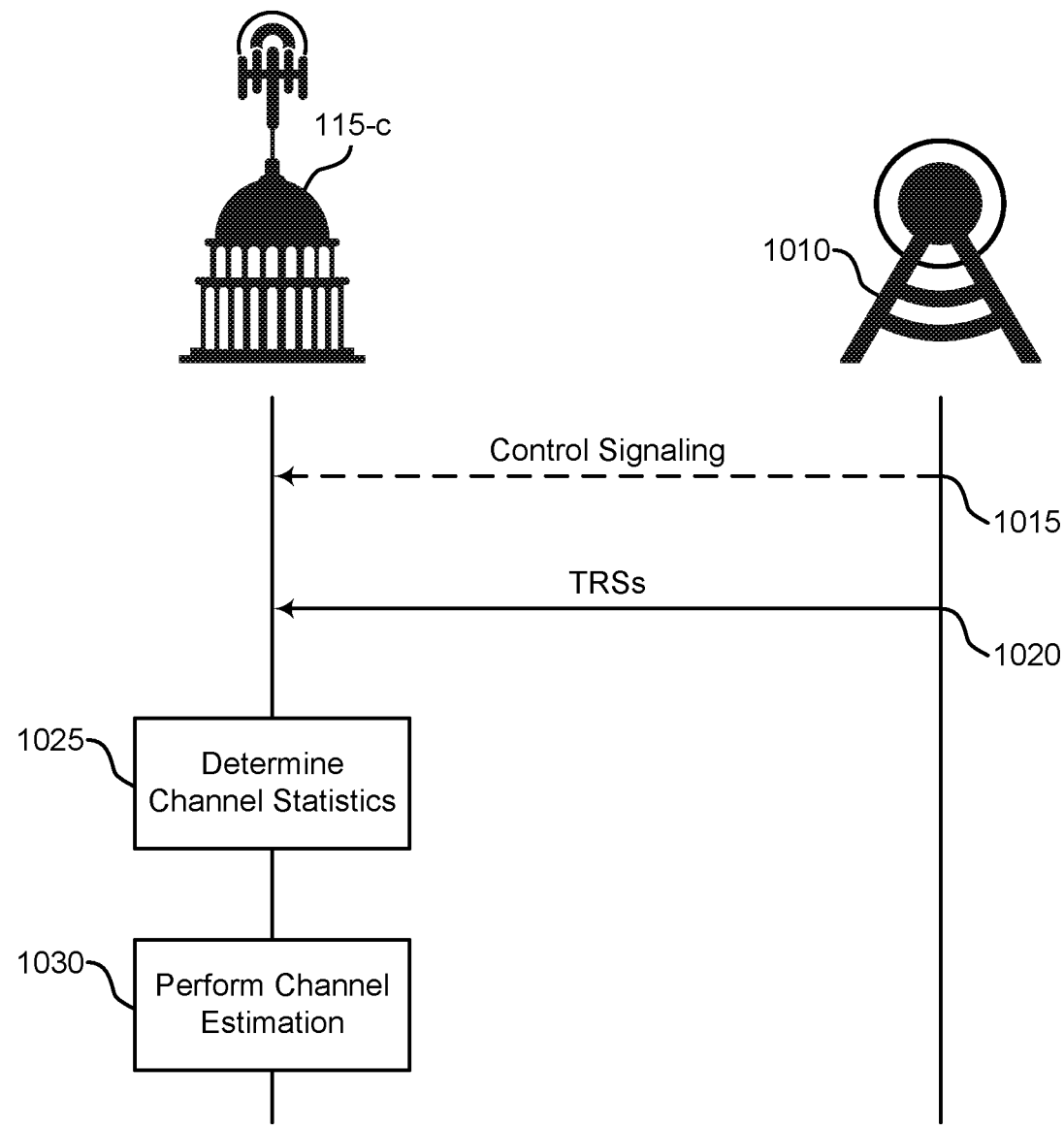

FIG. 10 illustrates an example of a process flow 1000 that supports reference signal patterns for multi-path channel estimation in accordance with aspects of the present disclosure. The process flow 1000 may implement or be implemented by aspects of the wireless communications system 100 or the wireless communications system 200. For example, the process flow 1000 may include a UE 115-c and a TRP 1010, which may be examples of corresponding devices described with reference to FIGS. 1 and 2. In the following description of the process flow 1000, some operations may be omitted from the process flow 1000, and other operations may be added to the process flow 1000.

In some examples, the UE 115-c may receive control signaling from the TRP 1010 at 1015. The control signaling may include a semi-static indication of TRS resources allocated for a set of TRSs. The semi-static indication may be provided via a SIB or an MCCH transmission that is specific to an MBSFN area or a multicast broadcast service (MBS). At 1020, the UE 115-c may receive the set of TRSs on the set of TRS resources indicated by the control signaling. The UE 115-c may receive the set of TRSs over each subcarrier in a set of contiguous frequency-domain resources configured for wide-area broadcast services, SFN-based services, or MBMS. The set of TRSs may be specific to wide-area terrestrial broadcast services, SFN-based broadcast services, MBMS, or a DMRS pattern associated with a non-uniform frequency spacing. The UE 115-c may receive the set of reference signals over a multi-path (for example, sparse wide-area) channel from a set of transmitting devices including the TRP 1010. The set of transmitting devices may be associated with an SFN.

At 1025, the UE 115-c may determine a set of channel statistics associated with the multi-path channel based on the received set of reference signals. The set of channel statistics may include a PDP associated with the multi-path channel. The PDP may indicate an intensity of channel taps associated with the multi-path channel as a function of tap delays. The tap delays may correspond to a time difference between an earliest time at which a TRS from the set of TRSs arrives at the UE 115-c and a latest arrival time at which a TRS from the set of TRSs arrives at the UE 115-c. The set of statistics may correspond to a QCL type (for example QCL-TypeA, QCL-TypeB, QCL-TypeC, QCL-TypeD). The UE 115-c may use the set of channel statistics to determine a channel support parameter associated with the multi-path channel (for example, a set of time-domain indices at which the multi-path channel is non-zero). At 1030, the UE 115-c may perform a channel estimation procedure associated with the multi-path channel using the set of channel statistics.

The process flow 1000 may support techniques for improved channel estimation at the UE 115-c. For example, the described techniques may enable the UE 115-c to estimate channel statistics (for example, a PDP) of a multi-path channel with greater accuracy, which may improve the accuracy of channel estimation procedures performed by the UE 115-c. Performing accurate channel estimation procedures may increase the likelihood of the UE 115-c successfully receiving transmissions (for example, MBMS transmissions, wide-area broadcast transmissions) over the multi-path channel, among other benefits.

Figure 11:
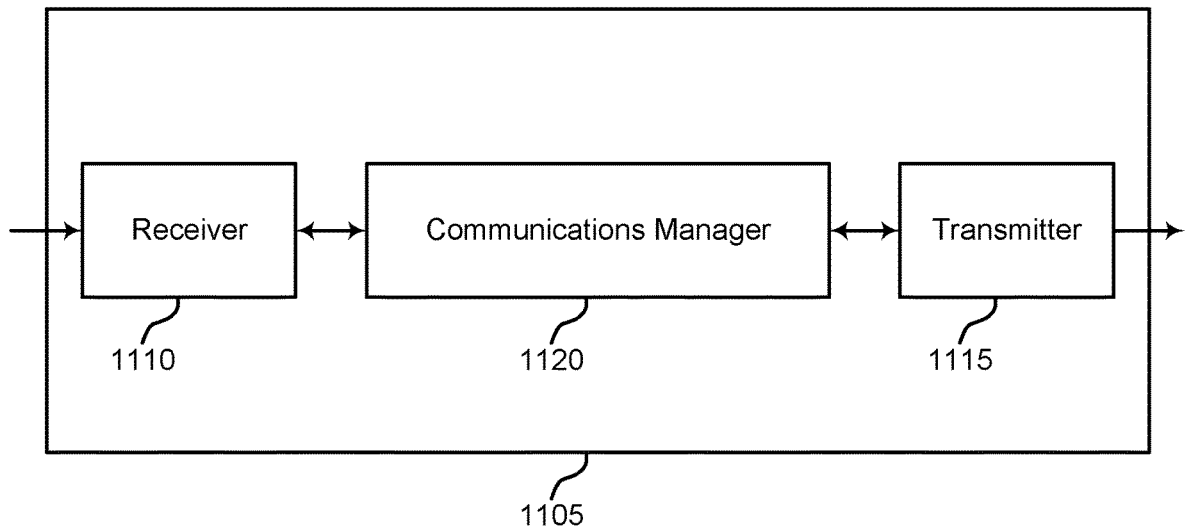
FIGS. 11 and 12 show block diagrams of devices that support reference signal patterns for multi-path channel estimation in accordance with aspects of the present disclosure.

FIG. 11 shows a block diagram of a device 1105 (for example, a UE 115) that supports reference signal patterns for multi-path channel estimation in accordance with aspects of the present disclosure. The device 1105 may include a receiver 1110, a transmitter 1115, and a communications manager 1120. The communications manager 1120 can be implemented, at least in part, by one or both of a modem and a processor. Each of these components may be in communication with one another (for example, via a set of buses).

The receiver 1110 may provide a means for receiving information such as packets, data, or control information associated with various information channels (for example, control channels, data channels, information channels related to reference signal patterns for multi-path channel estimation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, data, or control information associated with various information channels (for example, control channels, data channels, information channels related to reference signal patterns for multi-path channel estimation). In some examples, the transmitter 1115 may be co-located with a receiver 1110 in a transceiver component. The transmitter 1115 may utilize a single antenna or a set of multiple antennas.

The communications manager 1120, the receiver 1110, the transmitter 1115, or various combinations thereof or various components thereof may be examples of means for performing various aspects of reference signal patterns for multi-path channel estimation. For example, the communications manager 1120, the receiver 1110, the transmitter 1115, or various combinations or components thereof may support a method for performing a set of the functions described herein.

In some examples, the communications manager 1120 may be configured to perform various operations (for example, receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations.

The communications manager 1120 may support wireless communications at the device 1105 in accordance with examples as disclosed herein. For example, the communications manager 1120 may be configured as or otherwise support a means for receiving a set of reference signals on a set of resources in accordance with a first reference signal pattern, the set of resources associated with a data transmission, the first reference signal pattern associated with a non-uniform frequency spacing and a first row-sampled DFT matrix with rows that correspond to indices of the first reference signal pattern, the first row-sampled DFT matrix having a lower coherence than a second row-sampled DFT matrix associated with a second reference signal pattern that has a uniform frequency spacing. The communications manager 1120 may be configured as or otherwise support a means for receiving the data transmission over a multi-path channel on the set of resources. The communications manager 1120 may be configured as or otherwise support a means for decoding the data transmission based on the received set of reference signals.

Additionally or alternatively, the communications manager 1120 may support wireless communications at the device 1105 in accordance with examples as disclosed herein. For example, the communications manager 1120 may be configured as or otherwise support a means for receiving, over a multi-path channel, a set of TRSs that is specific to wide-area terrestrial broadcast services, SFN-based broadcast services, MBMSs, or a DMRS pattern associated with a non-uniform frequency spacing, the set of TRSs associated with a set of channel statistics corresponding to the multi-path channel.

By including or configuring the communications manager 1120 in accordance with examples, the device 1105 (for example, a processor controlling or otherwise coupled to the receiver 1110, the transmitter 1115, or the communications manager 1120) may support techniques for more efficient utilization of communication resources by enabling the device 1105 to perform channel estimation with greater accuracy and lower signaling overhead.

Figure 12:
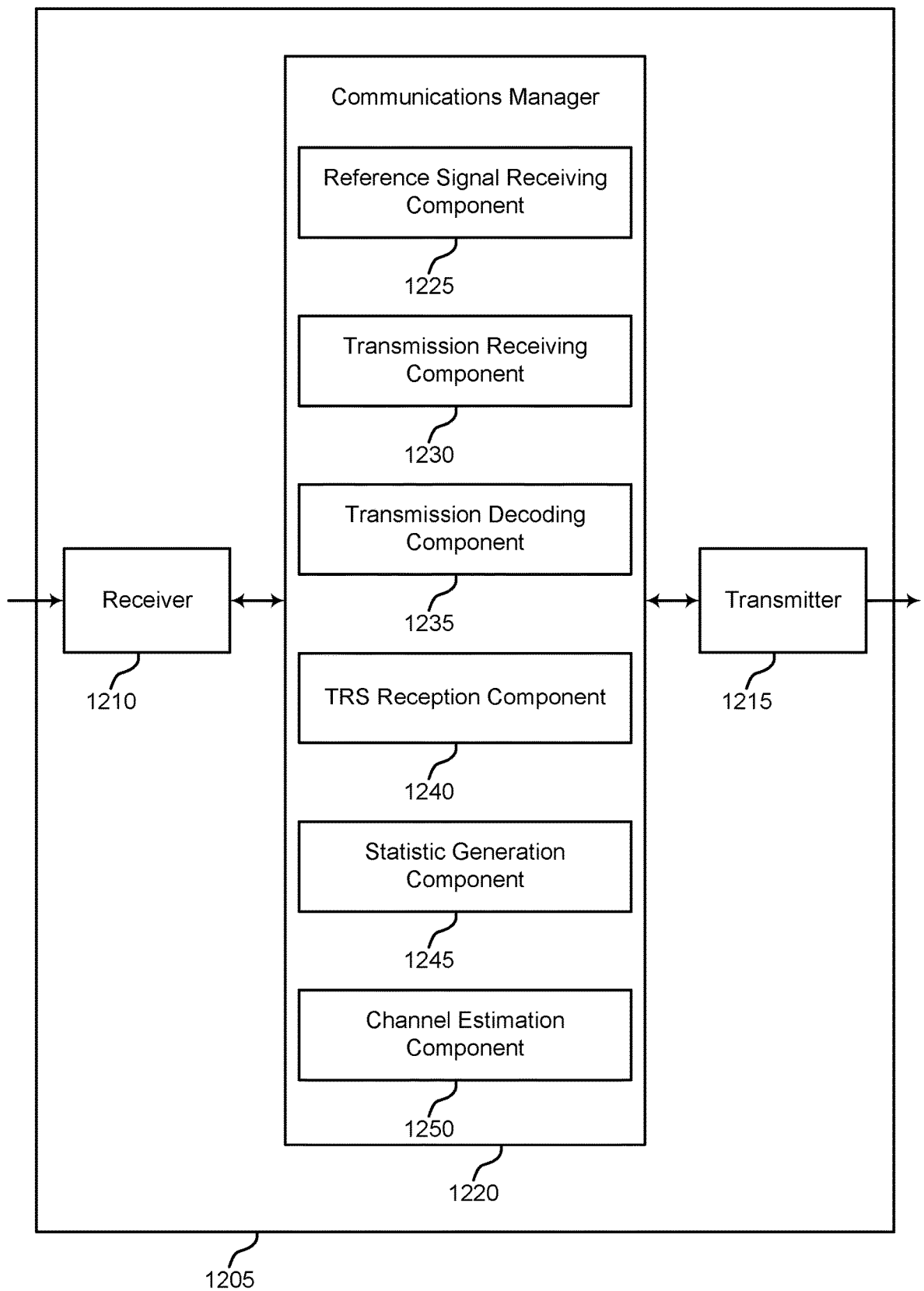

FIG. 12 shows a block diagram of a device 1205 (for example, a UE 115) that supports reference signal patterns for multi-path channel estimation in accordance with aspects of the present disclosure. The device 1205 may be an example of aspects of a device 1105 or a UE 115. The device 1205 may include a receiver 1210, a transmitter 1215, and a communications manager 1220. The communications manager 1220 can be implemented, at least in part, by one or both of a modem and a processor. Each of these components may be in communication with one another (for example, via a set of buses).

The receiver 1210 may provide a means for receiving information such as packets, data, or control information associated with various information channels (for example, control channels, data channels, information channels related to reference signal patterns for multi-path channel estimation). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, data, or control information associated with various information channels (for example, control channels, data channels, information channels related to reference signal patterns for multi-path channel estimation). In some examples, the transmitter 1215 may be co-located with a receiver 1210 in a transceiver component. The transmitter 1215 may utilize a single antenna or a set of multiple antennas.

The device 1205, or various components thereof, may be an example of means for performing various aspects of reference signal patterns for multi-path channel estimation. For example, the communications manager 1220 may include a reference signal receiving component 1225, a transmission receiving component 1230, a transmission decoding component 1235, a TRS reception component 1240, a statistic generation component 1245, and a channel estimation component 1250. In some examples, the communications manager 1220, or various components thereof, may be configured to perform various operations (for example, receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations.

The communications manager 1220 may support wireless communications at the device 1205 in accordance with examples as disclosed herein. The reference signal receiving component 1225 may be configured as or otherwise support a means for receiving a set of reference signals on a set of resources in accordance with a first reference signal pattern, the set of resources associated with a data transmission, the first reference signal pattern associated with a non-uniform frequency spacing and a first row-sampled DFT matrix with rows that correspond to indices of the first reference signal pattern, the first row-sampled DFT matrix having a lower coherence than a second row-sampled DFT matrix associated with a second reference signal pattern that has a uniform frequency spacing. The transmission receiving component 1230 may be configured as or otherwise support a means for receiving the data transmission over a multi-path channel on the set of resources. The transmission decoding component 1235 may be configured as or otherwise support a means for decoding the data transmission based on the received set of reference signals.

Additionally or alternatively, the communications manager 1220 may support wireless communications at the device 1205 in accordance with examples as disclosed herein. The TRS reception component 1240 may be configured as or otherwise support a means for receiving, over a multi-path channel, a set of TRSs that is specific to wide-area terrestrial broadcast services, SFN-based broadcast services, MBMSs, or a DMRS pattern associated with a non-uniform frequency spacing, the set of TRSs associated with a set of channel statistics corresponding to the multi-path channel.

Figure 13:
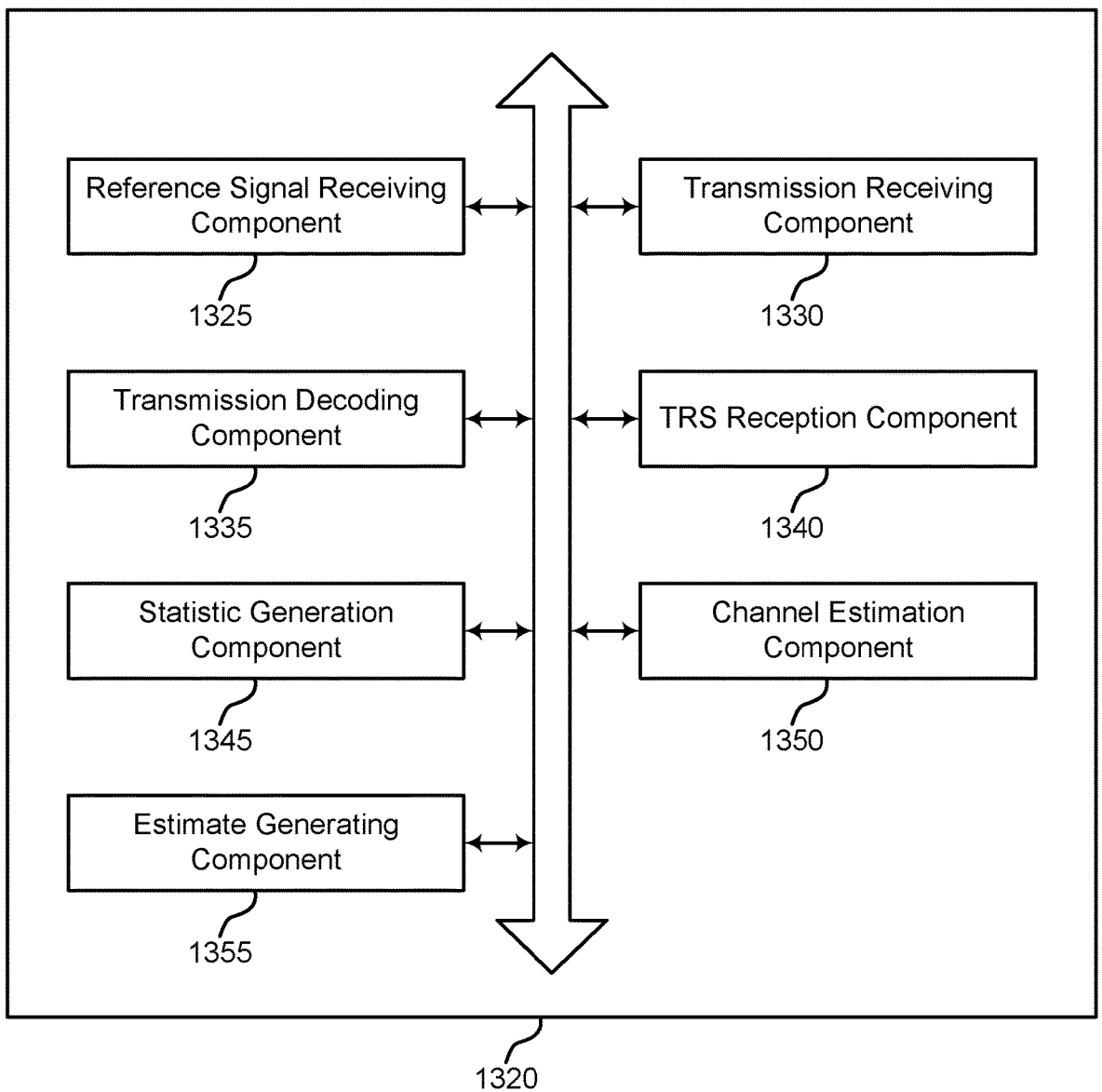
FIG. 13 shows a block diagram of a communications manager that supports reference signal patterns for multi-path channel estimation in accordance with aspects of the present disclosure.

FIG. 13 shows a block diagram of a communications manager 1320 that supports reference signal patterns for multi-path channel estimation in accordance with aspects of the present disclosure. The communications manager 1320, or various components thereof, may be an example of means for performing various aspects of reference signal patterns for multi-path channel estimation. For example, the communications manager 1320 may include a reference signal receiving component 1325, a transmission receiving component 1330, a transmission decoding component 1335, a TRS reception component 1340, a statistic generation component 1345, a channel estimation component 1350, and an estimate generating component 1355. Each of these components may communicate, directly or indirectly, with one another (for example, via a set of buses).

The communications manager 1320 may support wireless communications at the device 1305 in accordance with examples as disclosed herein. The reference signal receiving component 1325 may be configured as or otherwise support a means for receiving a set of reference signals on a set of resources in accordance with a first reference signal pattern, the set of resources associated with a data transmission, the first reference signal pattern associated with a non-uniform frequency spacing and a first row-sampled DFT matrix with rows that correspond to indices of the first reference signal pattern, the first row-sampled DFT matrix having a lower coherence than a second row-sampled DFT matrix associated with a second reference signal pattern that has a uniform frequency spacing. The transmission receiving component 1330 may be configured as or otherwise support a means for receiving the data transmission over a multi-path channel on the set of resources. The transmission decoding component 1335 may be configured as or otherwise support a means for decoding the data transmission based on the received set of reference signals.

In some examples, the reference signal pattern may include multiple constituent patterns, and the set of resources may include multiple sets of resources corresponding to the multiple constituent patterns. The multiple sets of resources may be associated with multiple respective uniform frequency spacings.

In some examples, the estimate generating component 1355 may be configured as or otherwise support a means for generating a filtering operator and a time-domain channel estimate based on receiving the set of reference signals over the multi-path channel.

In some examples, the time-domain channel estimate is associated with the multi-path channel. In some examples, the filtering operator is associated with a set of a set of reference signal indices associated with the received set of reference signals, a set of time-domain indices associated with the multi-path channel, or the first row-sampled DFT matrix that includes rows or columns corresponding to one or both of the set of reference signal indices or the set of time-domain indices.

In some examples, to support generating the time-domain channel estimate, the estimate generating component 1355 may be configured as or otherwise support a means for generating a set of inverse Fourier transform values based on performing a set of inverse Fourier transform operations on the received set of reference signals, the set of inverse Fourier transform values corresponding to a set of time-domain indices associated with the multi-path channel. In some examples, to support generating the time-domain channel estimate, the estimate generating component 1355 may be configured as or otherwise support a means for generating the time-domain channel estimate based on applying the filtering operator to the set of inverse Fourier transform values.

In some examples, to support generating the time-domain channel estimate, the estimate generating component 1355 may be configured as or otherwise support a means for generating one or both of a first portion of the time-domain channel estimate or a second portion of the time-domain channel estimate, the first portion of the time-domain channel estimate based on one or more of a set of inverse Fourier transform values associated with the received set of reference signals, the filtering operator, or a scalar inversion algorithm, the second portion of the time-domain channel estimate based on one or more of the set of inverse Fourier transform values, the filtering operator, or an iterative algorithm.

In some examples, the time-domain channel estimate is based on combining the first portion of the time-domain channel estimate and the second portion of the time-domain channel estimate. In some examples, the first portion of the time-domain channel estimate is based on a diagonal component of the filtering operator and the second portion of the time-domain channel estimate is based on one or both of the filtering operator or a non-diagonal component of the filtering operator.

In some examples, the reference signal receiving component 1325 may be configured as or otherwise support a means for receiving a set of a SIB, an RRC message, an MCCH message, or DCI indicating the set of resources. In some examples, the set of resources may include multiple sets of subcarrier indices associated with multiple respective uniform frequency spacings. In some examples, a first uniform frequency spacing of the respective uniform frequency spacings is indivisible by a second uniform frequency spacing of the respective uniform frequency spacings. In some examples, each of the respective uniform frequency spacings is indivisible by all other respective uniform frequency spacings. In some examples, a total quantity of data subcarriers associated with the data transmission may be divisible by each of the respective uniform frequency spacings.

In some examples, one or more of the multiple sets of resources or the multiple constituent reference signal patterns may be based on a quantity of antenna ports associated with transmission of the set of reference signals. In some examples, each of the antenna ports may be associated with a respective orthogonal cover code across multiple OFDM symbols. In some examples, the reference signal pattern may be specific to one or both of a bandwidth or a subcarrier spacing.

In some examples, the data transmission may be associated with a quantity of guard subcarriers that is specific to the reference signal pattern. In some examples, the reference signal pattern may be associated with one or both of a power-boosting scheme or a set of logical channels. In some examples, the reference signal pattern may be specific to a set of time-domain characteristics associated with the multi-path channel, the set of time-domain characteristics including a quantity of non-zero indices in a time-domain channel impulse response of the multi-path channel.

In some examples, the reference signal pattern may be defined with respect to a quantity of frequency resources that is different than a PRB. The quantity of frequency resources may include a system bandwidth, a frequency-domain resource allocation corresponding to the data transmission, or a periodicity of the reference signal pattern. In some examples, the reference signal pattern may be staggered across multiple OFDM symbols.

Additionally or alternatively, the communications manager 1320 may support wireless communications at the device 1305 in accordance with examples as disclosed herein. The TRS reception component 1340 may be configured as or otherwise support a means for receiving, over a multi-path channel, a set of TRSs that is specific to wide-area terrestrial broadcast services, SFN-based broadcast services, MBMSs, or a DMRS pattern associated with a non-uniform frequency spacing, the set of TRSs associated with a set of channel statistics corresponding to the multi-path channel.

In some examples, to support receiving the set of TRSs, the TRS reception component 1340 may be configured as or otherwise support a means for receiving the set of TRSs over each subcarrier in a set of contiguous frequency-domain resources configured for wide-area terrestrial broadcast services, SFN-based broadcast services, or MBMSs.

In some examples, the set of channel statistics may include a PDP of the multi-path channel, the PDP indicating an intensity of channel taps associated with the multi-path channel as a function of tap delays. In some examples, the set of channel statistics may correspond to a QCL type. In some examples, one or both of a frequency spacing associated with the set of TRSs or a symbol spacing associated with the set of TRSs may be specific to the set of TRSs.

In some examples, the TRS reception component 1340 may be configured as or otherwise support a means for receiving a semi-static indication of TRS resources allocated for the set of TRSs via one or both of a SIB or an MCCH transmission associated with one or both of an MBSFN area or an MBS.

Figure 14:
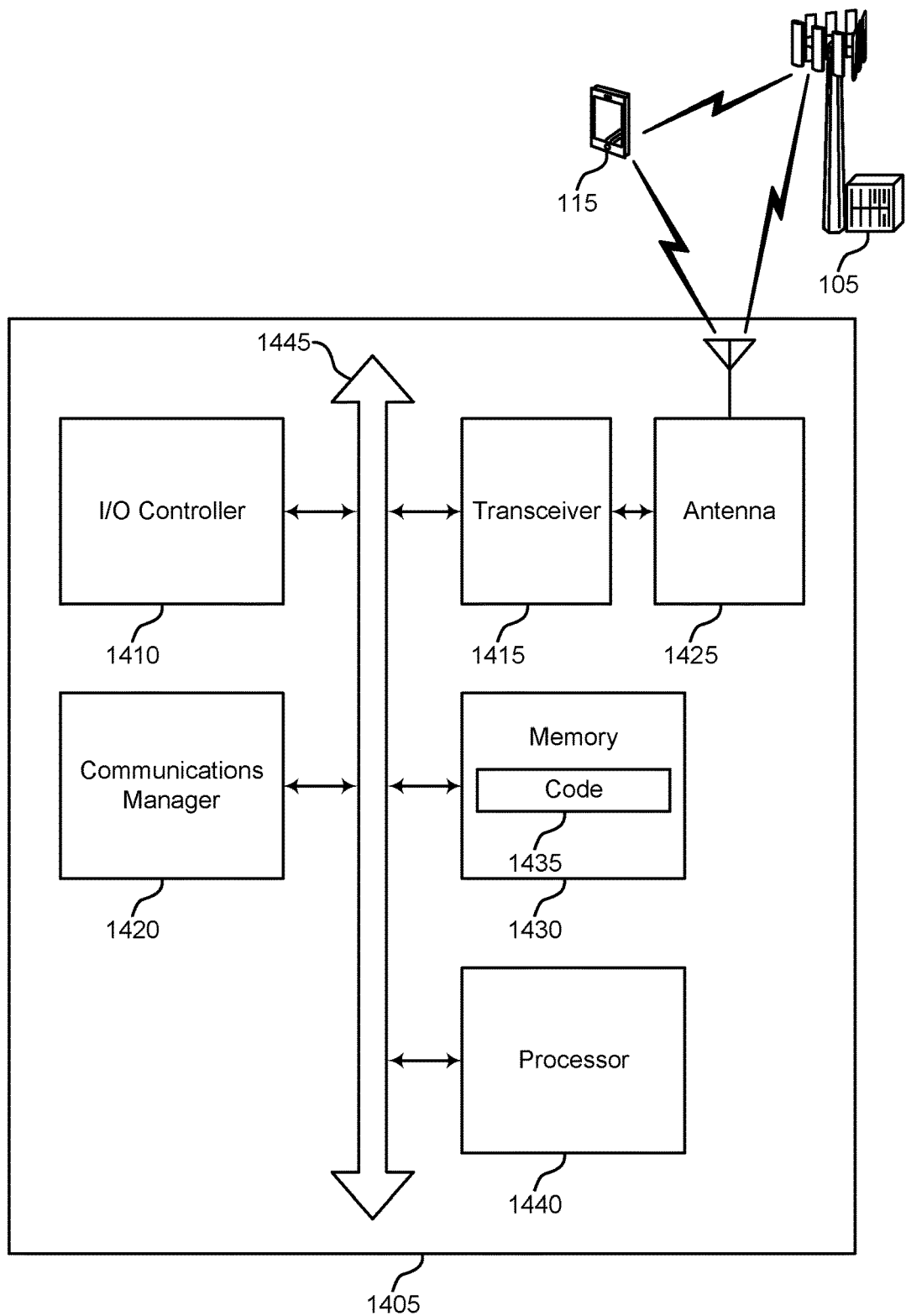
FIG. 14 shows a diagram of a system including a device that supports reference signal patterns for multi-path channel estimation in accordance with aspects of the present disclosure.

FIG. 14 shows a diagram of a system including a device 1405 that supports reference signal patterns for multi-path channel estimation in accordance with aspects of the present disclosure. The device 1405 may be an example of or include the components of a device 1105, a device 1205, or a UE 115. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (for example, operatively, communicatively, functionally, electronically, electrically) via a set of buses (for example, a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, an operator may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the set of antennas 1425, wired, or wireless links. For example, the transceiver 1415 may represent a wireless transceiver and may communicate bi-directionally with another wireless transceiver. The transceiver 1415 may also include a modem to modulate the packets, to provide the modulated packets to a set of antennas 1425 for transmission, and to demodulate packets received from the set of antennas 1425. The transceiver 1415, or the transceiver 1415 and a set of antennas 1425, may be an example of a transmitter 1115, a transmitter 1215, a receiver 1110, and a receiver 1210.

The memory 1430 may include random-access memory (RAM) and read-only memory (ROM). The memory 1430 may store computer-readable, computer-executable code 1435 including instructions that, upon being executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (for example, upon being compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (for example, a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, or a discrete hardware component). In some cases, the processor 1440 may be configured to operate a memory array using a memory controller. In some other cases, a memory controller may be integrated into the processor 1440. The processor 1440 may be configured to execute computer-readable instructions stored in a memory (for example, the memory 1430) to cause the device 1405 to perform various functions (for example, functions or tasks supporting reference signal patterns for multi-path channel estimation). For example, the device 1405 or a component of the device 1405 may include a processor 1440 and memory 1430 coupled to the processor 1440, the processor 1440 and memory 1430 configured to perform various functions described herein.

The communications manager 1420 may support wireless communications at the device 1405 in accordance with examples as disclosed herein. For example, the communications manager 1420 may be configured as or otherwise support a means for receiving a set of reference signals on a set of resources in accordance with a first reference signal pattern, the set of resources associated with a data transmission, the first reference signal pattern associated with a non-uniform frequency spacing and a first row-sampled DFT matrix with rows that correspond to indices of the first reference signal pattern, the first row-sampled DFT matrix having a lower coherence than a second row-sampled DFT matrix associated with a second reference signal pattern that has a uniform frequency spacing. The communications manager 1420 may be configured as or otherwise support a means for receiving the data transmission over a multi-path channel on the set of resources. The communications manager 1420 may be configured as or otherwise support a means for decoding the data transmission based on the received set of reference signals.

Additionally or alternatively, the communications manager 1420 may support wireless communications at the device 1405 in accordance with examples as disclosed herein. For example, the communications manager 1420 may be configured as or otherwise support a means for receiving, over a multi-path channel, a set of TRSs that is specific to wide-area terrestrial broadcast services, SFN-based broadcast services, MBMSs, or a DMRS pattern associated with a non-uniform frequency spacing, the set of TRSs associated with a set of channel statistics corresponding to the multi-path channel.

By including or configuring the communications manager 1420 in accordance with examples, the device 1405 may support techniques for improved channel estimation and lower signaling overhead. For example, the device 1405 may be configured to receive reference signals on resources corresponding to a set of reference signal patterns. These reference signal patterns may be associated with lower signaling overhead (for example, fewer resources) and low coherence, which may enable the device 1405 to perform channel estimation (for example, by processing the received reference signals) with greater efficiency and lower signaling overhead, among other benefits.

In some examples, the communications manager 1420 may be configured to perform various operations (for example, receiving, monitoring, transmitting) using or otherwise in cooperation with the transceiver 1415 or the set of antennas 1425. Although the communications manager 1420 is illustrated as a separate component, in some examples, a set of functions described with reference to the communications manager 1420 may be supported by or performed by the processor 1440, the memory 1430, or the code 1435. For example, the code 1435 may include instructions executable by the processor 1440 to cause the device 1405 to perform various aspects of reference signal patterns for multi-path channel estimation, or the processor 1440 and the memory 1430 may be otherwise configured to perform or support such operations.

Figure 15:
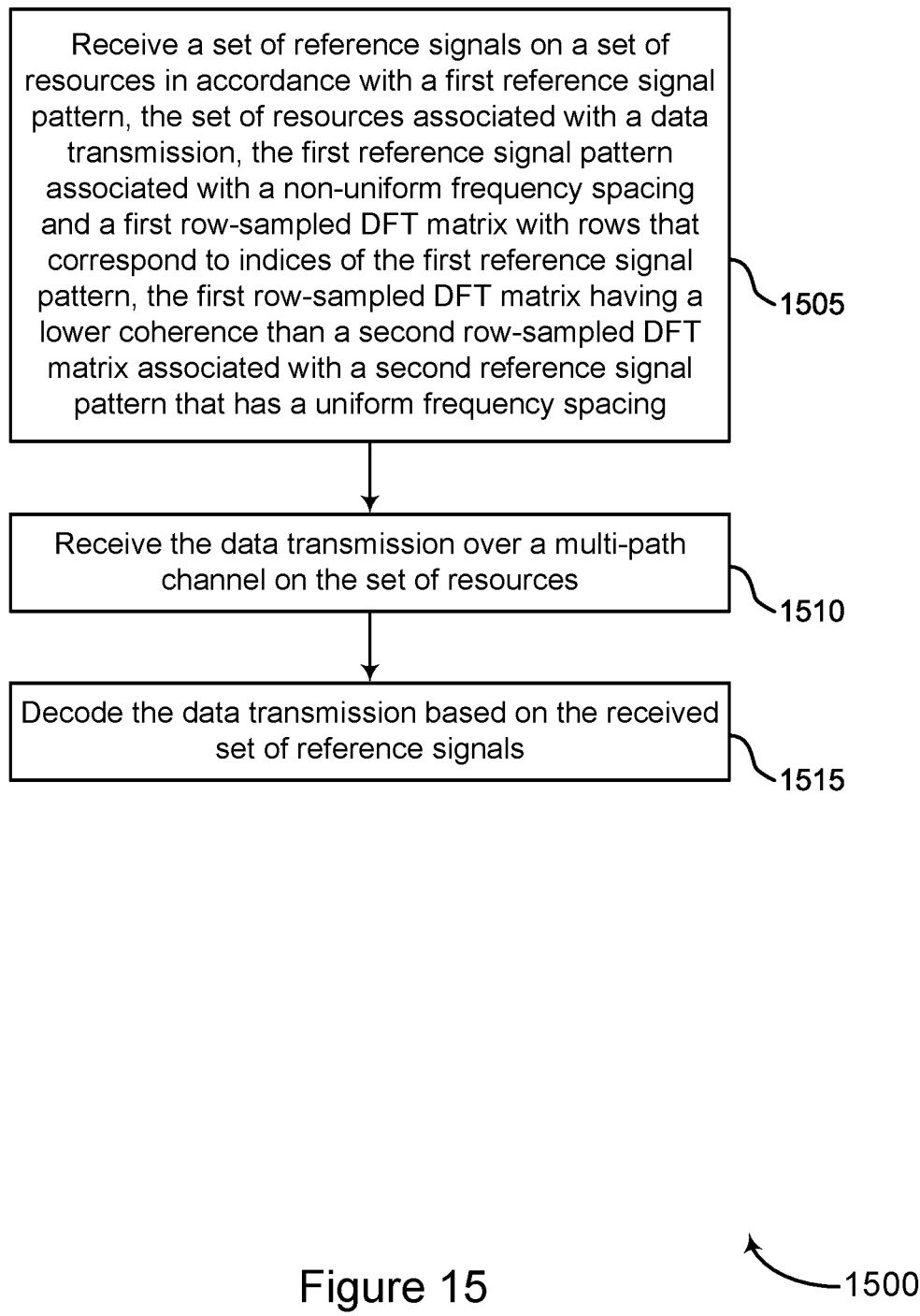

FIG. 15 shows a flowchart illustrating a method 1500 that supports reference signal patterns for multi-path channel estimation in accordance with aspects of the present disclosure. The operations of the method 1500 may be implemented by a device or its components. For example, the operations of the method 1500 may be performed by a UE 115 as described with reference to FIGS. 1-14. In some examples, a device may execute a set of instructions to control the functional elements of the device to perform the described functions. Additionally or alternatively, the device may perform aspects of the described functions using special-purpose hardware.

At 1505, the method may include receiving a set of reference signals on a set of resources in accordance with a first reference signal pattern, the set of resources associated with a data transmission, the first reference signal pattern associated with a non-uniform frequency spacing and a first row-sampled DFT matrix with rows that correspond to indices of the first reference signal pattern, the first row-sampled DFT matrix having a lower coherence than a second row-sampled DFT matrix associated with a second reference signal pattern that has a uniform frequency spacing. The operations of 1505 may be performed in accordance with examples as disclosed herein. In some examples, aspects of the operations of 1505 may be performed by a reference signal receiving component 1325 as described with reference to FIG. 13.

At 1510, the method may include receiving the data transmission over a multi-path channel on the set of resources. The operations of 1510 may be performed in accordance with examples as disclosed herein. In some examples, aspects of the operations of 1510 may be performed by a transmission receiving component 1330 as described with reference to FIG. 13.

At 1515, the method may include decoding the data transmission based on the received set of reference signals. The operations of 1515 may be performed in accordance with examples as disclosed herein. In some examples, aspects of the operations of 1515 may be performed by a transmission decoding component 1335 as described with reference to FIG. 13.

Figure 16:
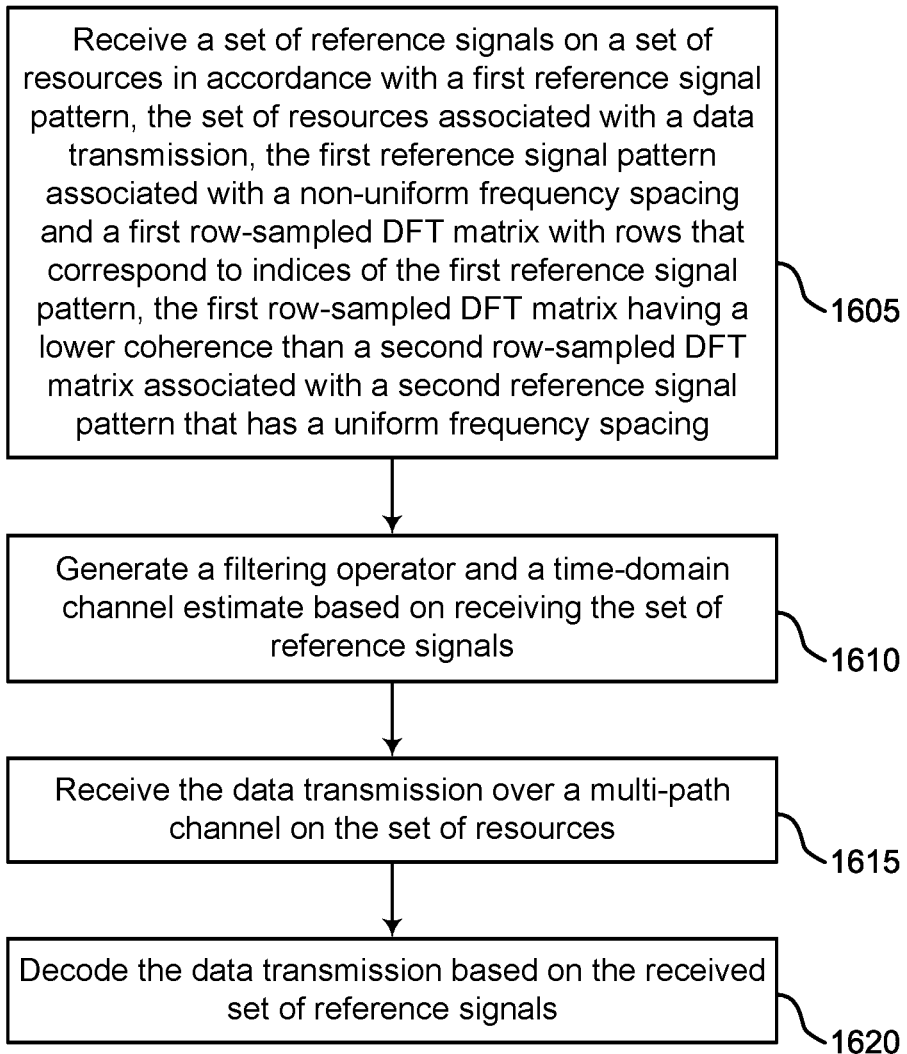

FIG. 16 shows a flowchart illustrating a method 1600 that supports reference signal patterns for multi-path channel estimation in accordance with aspects of the present disclosure. The operations of the method 1600 may be implemented by a device or its components. For example, the operations of the method 1600 may be performed by a UE 115 as described with reference to FIGS. 1-14. In some examples, a device may execute a set of instructions to control the functional elements of the device to perform the described functions. Additionally or alternatively, the device may perform aspects of the described functions using special-purpose hardware.

At 1605, the method may include receiving a set of reference signals on a set of resources in accordance with a first reference signal pattern, the set of resources associated with a data transmission, the first reference signal pattern associated with a non-uniform frequency spacing and a first row-sampled DFT matrix with rows that correspond to indices of the first reference signal pattern, the first row-sampled DFT matrix having a lower coherence than a second row-sampled DFT matrix associated with a second reference signal pattern that has a uniform frequency spacing. The operations of 1605 may be performed in accordance with examples as disclosed herein. In some examples, aspects of the operations of 1605 may be performed by a reference signal receiving component 1325 as described with reference to FIG. 13.

At 1610, the method may include generating a filtering operator and a time-domain channel estimate based on receiving the set of reference signals over the multi-path channel. The operations of 1610 may be performed in accordance with examples as disclosed herein. In some examples, aspects of the operations of 1610 may be performed by an estimate generating component 1355 as described with reference to FIG. 13.

At 1615, the method may include receiving the data transmission over a multi-path channel on the set of resources. The operations of 1615 may be performed in accordance with examples as disclosed herein. In some examples, aspects of the operations of 1615 may be performed by a transmission receiving component 1330 as described with reference to FIG. 13.

At 1620, the method may include decoding the data transmission based on the received set of reference signals. The operations of 1620 may be performed in accordance with examples as disclosed herein. In some examples, aspects of the operations of 1620 may be performed by a transmission decoding component 1335 as described with reference to FIG. 13.

FIG. 17 shows a flowchart illustrating a method 1700 that supports reference signal patterns for multi-path channel estimation in accordance with aspects of the present disclosure. The operations of the method 1700 may be implemented by a device or its components. For example, the operations of the method 1700 may be performed by a UE 115 as described with reference to FIGS. 1-14. In some examples, a device may execute a set of instructions to control the functional elements of the device to perform the described functions. Additionally or alternatively, the device may perform aspects of the described functions using special-purpose hardware.

At 1705, the method may include receiving, over a multi-path channel, a set of TRSs that is specific to wide-area terrestrial broadcast services, SFN-based broadcast services, MBMSs, or a DMRS pattern associated with a non-uniform frequency spacing, the set of TRSs associated with a set of channel statistics corresponding to the multi-path channel. The operations of 1705 may be performed in accordance with examples as disclosed herein. In some examples, aspects of the operations of 1705 may be performed by a TRS reception component 1340 as described with reference to FIG. 13.

Figure 18:
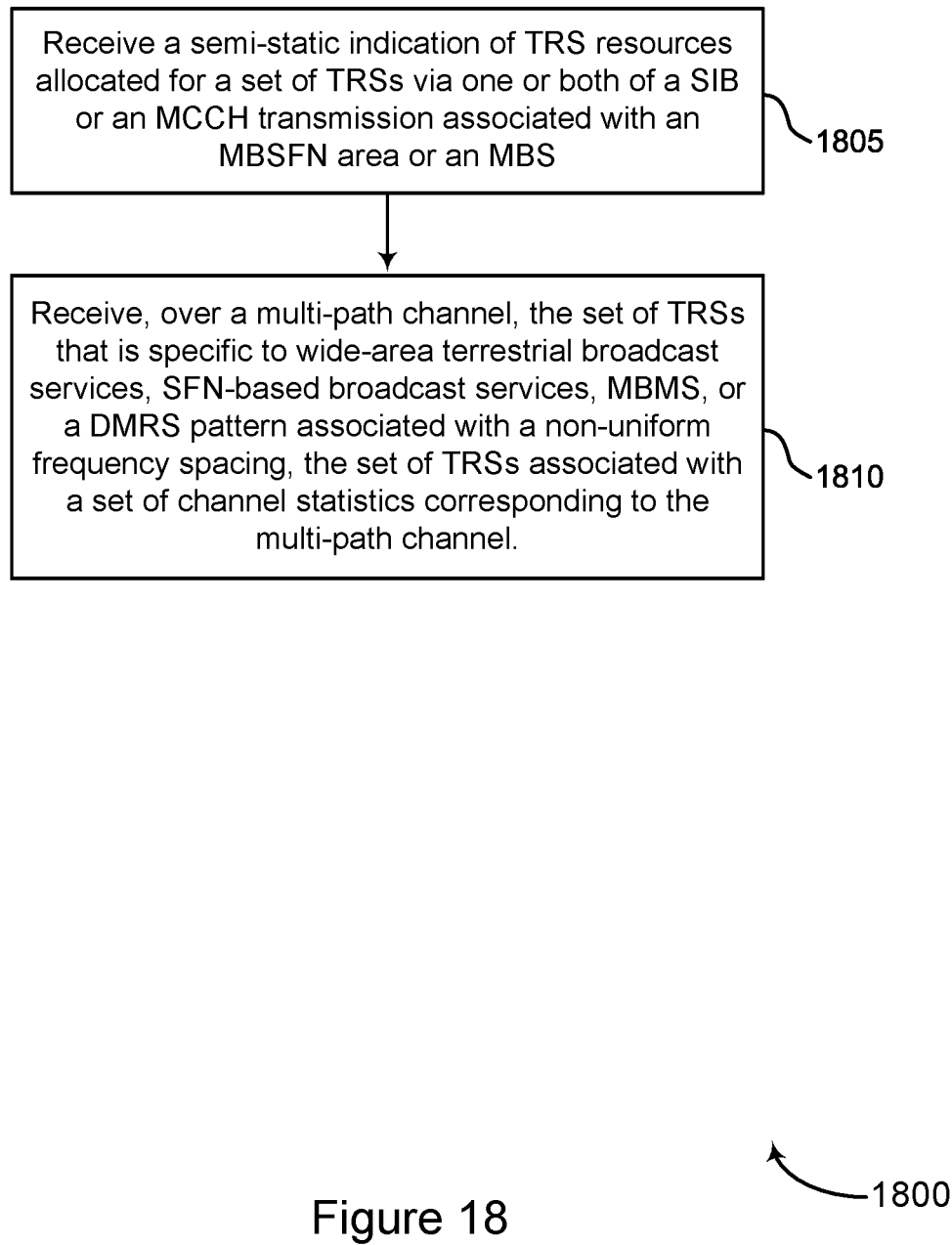

FIG. 18 shows a flowchart illustrating a method 1800 that supports reference signal patterns for multi-path channel estimation in accordance with aspects of the present disclosure. The operations of the method 1800 may be implemented by a device or its components. For example, the operations of the method 1800 may be performed by a UE 115 as described with reference to FIGS. 1-14. In some examples, a device may execute a set of instructions to control the functional elements of the device to perform the described functions. Additionally or alternatively, the device may perform aspects of the described functions using special-purpose hardware.

At 1805, the method may include receiving a semi-static indication of TRS resources allocated for the set of TRSs via one or both of a SIB or an MCCH transmission associated with one or both of an MBSFN area or an MBS. The operations of 1805 may be performed in accordance with examples as disclosed herein. In some examples, aspects of the operations of 1805 may be performed by a TRS reception component 1340 as described with reference to FIG. 13.

At 1810, the method may include receiving, over a multi-path channel, a set of TRSs that is specific to wide-area terrestrial broadcast services, SFN-based broadcast services, MBMSs, or a DMRS pattern associated with a non-uniform frequency spacing, the set of TRSs associated with a set of channel statistics corresponding to the multi-path channel. The operations of 1810 may be performed in accordance with examples as disclosed herein. In some examples, aspects of the operations of 1810 may be performed by a TRS reception component 1340 as described with reference to FIG. 13.

The following provides an overview of aspects of the present disclosure:

Aspect 1: A method for wireless communications at a device, comprising: receiving a set of reference signals on a set of resources in accordance with a first reference signal pattern, the set of resources associated with a data transmission, the first reference signal pattern associated with a non-uniform frequency spacing and a first row-sampled Discrete Fourier Transform (DFT) matrix with rows that correspond to indices of the first reference signal pattern, the first row-sampled DFT matrix having a lower coherence than a second row-sampled DFT matrix associated with a second reference signal pattern that has a uniform frequency spacing; receiving the data transmission over a multi-path channel on the set of resources; and decoding the data transmission based at least in part on the received set of reference signals.

Aspect 2: The method of aspect 1, wherein the first reference signal pattern comprises two or more constituent reference signal patterns; and the set of resources comprises two or more subsets of resources corresponding to the two or more constituent reference signal patterns, the two or more subsets of resources associated with two or more respective uniform frequency spacings.

Aspect 3: The method of aspect 2, further comprising generating a filtering operator and a time-domain channel estimate based at least in part on receiving the set of reference signals over the multi-path channel.

Aspect 4: The method of aspect 3, wherein the time-domain channel estimate is associated with the multi-path channel; and the filtering operator is associated with one or more of a set of reference signal indices associated with the received set of reference signals, a set of time-domain indices associated with the multi-path channel, or a DFT matrix that comprises rows or columns corresponding to one or both of the set of reference signal indices or the set of time-domain indices.

Aspect 5: The method of any of aspects 3 through 4, wherein generating the time-domain channel estimate comprises: generating a set of inverse Fourier transform values based at least in part on performing one or more inverse Fourier transform operations on the received set of reference signals, the set of inverse Fourier transform values corresponding to a set of time-domain indices associated with the multi-path channel; and generating the time-domain channel estimate based at least in part on applying the filtering operator to the set of inverse Fourier transform values.

Aspect 6: The method of any of aspects 3 through 5, wherein generating the time-domain channel estimate comprises: generating one or both of a first portion of the time-domain channel estimate or a second portion of the time-domain channel estimate, wherein the first portion of the time-domain channel estimate is based at least in part on one or more of a set of inverse Fourier transform values associated with the received set of reference signals, the filtering operator, or a scalar inversion algorithm, and wherein the second portion of the time-domain channel estimate is based at least in part on one or more of the set of inverse Fourier transform values, the filtering operator, or an iterative algorithm.

Aspect 7: The method of aspect 6, wherein the first portion of the time-domain channel estimate is based at least in part on a diagonal component of the filtering operator; and the second portion of the time-domain channel estimate is based at least in part on one or both of the filtering operator or a non-diagonal component of the filtering operator.

Aspect 8: The method of aspect 7, wherein the iterative algorithm comprises one or more of a conjugate gradient algorithm, a combination of a conjugate gradient algorithm and a preconditioning operation, or a Gaussian belief propagation algorithm.

Aspect 9: The method of any of aspects 2 through 8, wherein a first uniform frequency spacing of the two or more respective uniform frequency spacings is indivisible by a second uniform frequency spacing of the two or more respective uniform frequency spacings.

Aspect 10: The method of any of aspects 2 through 9, wherein each of the two or more respective uniform frequency spacings is indivisible by all other uniform frequency spacings of the two or more respective uniform frequency spacings.

Aspect 11: The method of any of aspects 2 through 10, wherein a total quantity of data subcarriers associated with the data transmission is divisible by each of the two or more respective uniform frequency spacings.

Aspect 12: The method of any of aspects 2 through 11, wherein one or more of the two or more subsets of resources or the two or more constituent reference signal patterns are based at least in part on a quantity of antenna ports associated with transmission of the set of reference signals.

Aspect 13: The method of aspect 12, wherein each of the antenna ports is associated with a respective orthogonal cover code across a plurality of orthogonal frequency division multiplexing symbols.

Aspect 14: The method of any of aspects 1 through 13, wherein the first reference signal pattern is specific to one or both of a bandwidth or a subcarrier spacing.

Aspect 15: The method of any of aspects 1 through 14, wherein the data transmission is associated with a quantity of guard subcarriers that is specific to the first reference signal pattern.

Aspect 16: The method of any of aspects 1 through 15, wherein the first reference signal pattern is associated with one or both of a power boosting scheme or a set of logical channels.

Aspect 17: The method of any of aspects 1 through 16, wherein the first reference signal pattern is specific to a set of time-domain characteristics associated with the multi-path channel, the set of time-domain characteristics comprising a quantity of non-zero indices in a time-domain channel impulse response of the multi-path channel.

Aspect 18: The method of any of aspects 1 through 17, wherein the first reference signal pattern is defined with respect to a quantity of frequency resources that is different than a physical resource block.

Aspect 19: The method of aspect 18, wherein the quantity of frequency resources comprises a system bandwidth, a frequency-domain resource allocation corresponding to the data transmission, or a periodicity of the first reference signal pattern.

Aspect 20: The method of any of aspects 1 through 19, wherein the first reference signal pattern is staggered across a plurality of orthogonal frequency division multiplexing symbols.

Aspect 21: The method of any of aspects 1 through 20, further comprising receiving one or more of a system information block, a radio resource control message, a multicast control channel message, or downlink control information indicating the set of resources.

Aspect 22: A method for wireless communications at a device, comprising: receiving, over a multi-path channel, a set of tracking reference signals that is specific to one or more of wide-area terrestrial broadcast services, single frequency network-based broadcast services, multimedia broadcast multicast services, or a demodulation reference signal pattern associated with a non-uniform frequency spacing, wherein the set of tracking reference signals is associated with a set of channel statistics corresponding to the multi-path channel.

Aspect 23: The method of aspect 22, wherein the set of channel statistics comprises a power delay profile of the multi-path channel, the power delay profile indicating an intensity of channel taps associated with the multi-path channel as a function of tap delays.

Aspect 24: The method of any of aspects 22 through 23, wherein the set of channel statistics corresponds to a quasi co-location type.

Aspect 25: The method of any of aspects 22 through 24, wherein one or both of a frequency spacing associated with the set of tracking reference signals or a symbol spacing associated with the set of tracking reference signals is specific to the set of tracking reference signals.

Aspect 26: The method of any of aspects 22 through 25, wherein receiving the set of tracking reference signals comprises receiving the set of tracking reference signals over each subcarrier in a set of contiguous frequency-domain resources configured for one or more of wide-area terrestrial broadcast services, single frequency network-based broadcast services, or multimedia broadcast multicast services.

Aspect 27: The method of any of aspects 22 through 26, further comprising receiving a semi static indication of tracking reference signal resources allocated for the set of tracking reference signals via one or both of a system information block or a multicast control channel transmission associated with one or both of a multicast broadcast single frequency network area or a multicast broadcast service.

Aspect 28: An apparatus for wireless communications at a device, comprising a processor; memory coupled with the processor; and instructions stored in the memory and executable by the processor to cause the apparatus to perform a method of any of aspects 1 through 21.

Aspect 29: An apparatus for wireless communications at a device, comprising at least one means for performing a method of any of aspects 1 through 21.

Aspect 30: A non-transitory computer-readable medium storing code for wireless communications at a device, the code comprising instructions executable by a processor to perform a method of any of aspects 1 through 21.

Aspect 31: An apparatus for wireless communications at a device, comprising a processor; memory coupled with the processor; and instructions stored in the memory and executable by the processor to cause the apparatus to perform a method of any of aspects 22 through 27.

Aspect 32: An apparatus for wireless communications at a device, comprising at least one means for performing a method of any of aspects 22 through 27.

Aspect 33: A non-transitory computer-readable medium storing code for wireless communications at a device, the code comprising instructions executable by a processor to perform a method of any of aspects 22 through 27.

It is noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles.

The various illustrative blocks and components described in connection with the disclosure herein may be implemented or performed with a general-purpose processor, a DSP, an ASIC, a CPU, an FPGA or other programmable logic device, discrete gate or transistor logic, or discrete hardware components designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, a set of microprocessors in conjunction with a DSP core, or any other such configuration).

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For cases in which software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (for example, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions. For example, "determining" can include calculating, computing, processing, deriving, investigating, looking up (such as via looking up in a table, a database or another data structure), or ascertaining. Also, "determining" can include receiving (such as receiving information), or accessing (such as accessing data in a memory). Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. For cases in which the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. The disclosure is not limited to the examples and designs described herein but is to be accorded the broadest scope consistent with the principles and novel features disclosed herein.

What is claimed is:

1. A method for wireless communications at a device, comprising:
    receiving a set of reference signals on a set of resources in accordance with a first reference signal pattern, the set of resources associated with a data transmission, the first reference signal pattern associated with a non-uniform frequency spacing and a first row-sampled Discrete Fourier Transform (DFT) matrix with rows that correspond to indices of the first reference signal pattern, the first row-sampled DFT matrix having a lower coherence than a second row-sampled DFT matrix associated with a second reference signal pattern that has a uniform frequency spacing;
    receiving the data transmission over a multi-path channel on the set of resources; and
    decoding the data transmission based at least in part on the received set of reference signals.

2. The method of claim 1, wherein:
    the first reference signal pattern comprises two or more constituent reference signal patterns; and
    the set of resources comprises two or more subsets of resources corresponding to the two or more constituent reference signal patterns, the two or more subsets of resources associated with two or more respective uniform frequency spacings.

3. The method of claim 2, further comprising generating a filtering operator and a time-domain channel estimate based at least in part on receiving the set of reference signals over the multi-path channel.

4. The method of claim 3, wherein:
    the time-domain channel estimate is associated with the multi-path channel; and
    the filtering operator is associated with one or more of a set of reference signal indices associated with the received set of reference signals, a set of time-domain indices associated with the multi-path channel, or a DFT matrix that comprises rows or columns corresponding to one or both of the set of reference signal indices or the set of 7 time-domain indices.

5. The method of claim 3, wherein generating the time-domain channel estimate comprises:
    generating a set of inverse Fourier transform values based at least in part on performing one or more inverse Fourier transform operations on the received set of reference signals, the set of inverse Fourier transform values corresponding to a set of time-domain indices associated with the multi-path channel; and
    generating the time-domain channel estimate based at least in part on applying the filtering operator to the set of inverse Fourier transform values.

6. The method of claim 3, wherein generating the time-domain channel estimate comprises:
    generating one or both of a first portion of the time-domain channel estimate or a second portion of the time-domain channel estimate, wherein the first portion of the time-domain channel estimate is based at least in part on one or more of a set of inverse Fourier transform values associated with the received set of reference signals, the filtering operator, or a scalar inversion algorithm, and wherein the second portion of the time-domain channel estimate is based at least in part on one or more of the set of inverse Fourier transform values, the filtering operator, or an iterative algorithm.

7. The method of claim 6, wherein:
    the first portion of the time-domain channel estimate is based at least in part on a diagonal component of the filtering operator; and
    the second portion of the time-domain channel estimate is based at least in part on one or both of the filtering operator or a non-diagonal component of the filtering operator.

8. The method of claim 7, wherein the iterative algorithm comprises one or more of a conjugate gradient algorithm, a combination of a conjugate gradient algorithm and a preconditioning operation, or a Gaussian belief propagation algorithm.

9. The method of claim 1, further comprising receiving one or more of a system information block, a radio resource control message, a multicast control channel 3 message, or downlink control information indicating the set of resources.

10. The method of claim 2, wherein a first uniform frequency spacing of the two or more respective uniform frequency spacings is indivisible by a second uniform frequency spacing of the two or more respective uniform frequency spacings.

11. The method of claim 2, wherein each of the two or more respective uniform frequency spacings is indivisible by all other uniform frequency spacings of the two or more respective uniform frequency spacings.

12. The method of claim 2, wherein a total quantity of data subcarriers associated with the data transmission is divisible by each of the two or more respective uniform frequency spacings.

13. The method of claim 2, wherein one or more of the two or more subsets of resources or the two or more constituent reference signal patterns are based at least in part on a quantity of antenna ports associated with transmission of the set of reference signals.

14. The method of claim 13, wherein each of the antenna ports is associated with a respective orthogonal cover code across a plurality of orthogonal frequency division multiplexing symbols.

15. The method of claim 2, wherein the first reference signal pattern is specific to one or both of a bandwidth or a subcarrier spacing.

16. The method of claim 2, wherein the data transmission is associated with a quantity of guard subcarriers that is specific to the first reference signal pattern.

17. The method of claim 2, wherein the first reference signal pattern is associated with one or both of a power-boosting scheme or a set of logical channels.

18. The method of claim 2, wherein the first reference signal pattern is specific to a set of time-domain characteristics associated with the multi-path channel, the set of time-domain characteristics comprising a quantity of non-zero indices in a 4 time-domain channel impulse response of the multi-path channel.

19. The method of claim 2, wherein the first reference signal pattern is defined with respect to a quantity of frequency resources that is different than a physical resource block.

20. The method of claim 19, wherein:
the quantity of frequency resources comprises a system bandwidth, a frequency-domain resource allocation corresponding to the data transmission, or a periodicity of the first reference signal pattern.

21. The method of claim 2, wherein the first reference signal pattern is staggered across a plurality of orthogonal frequency-division multiplexing symbols.

22. An apparatus for wireless communications, comprising:
one or more memories storing processor-executable code; and
one or more processors coupled with the one or more memories and individually or collectively operable to execute the code to cause the apparatus to:
receive a set of reference signals on a set of resources in accordance with a first reference signal pattern, the set of resources associated with a data transmission, the first reference signal pattern associated with a non-uniform frequency spacing and a first row-sampled Discrete Fourier Transform (DFT)matrix with rows that correspond to indices of the first reference signal pattern, the first row-sampled DFT matrix having a lower coherence than a second row-sampled DFT matrix associated with a second reference signal pattern that has a uniform frequency spacing;
receive the data transmission over a multi-path channel on the set of resources; and
decode the data transmission based at least in part on the received set of reference signals.

23. The apparatus of claim 22, wherein:
the first reference signal pattern comprises two or more constituent reference signal patterns; and
the set of resources comprises two or more subsets of resources corresponding to the two or more constituent reference signal patterns, the two or more subsets of 6 resources associated with two or more respective uniform frequency spacings.

24. The apparatus of claim 23, wherein the one or more processors are individually or collectively operable to execute the code to cause the apparatus to generate a filtering operator and a time-domain channel estimate based at least in part on receiving the set of reference signals over the multi-path channel.

25. The apparatus of claim 24, wherein:
the time-domain channel estimate is associated with the multi-path channel; and
the filtering operator is associated with one or more of a set of reference signal indices associated with the received set of reference signals, a set of time-domain indices associated with the multi-path channel, or a DFT matrix that comprises rows or columns corresponding to one or both of the set of reference signal indices or the set of 7 time-domain indices.

26. The apparatus of claim 24, wherein, to generate the time-domain channel estimate, the one or more processors are individually or collectively operable to execute the code to cause the apparatus to:
generate a set of inverse Fourier transform values based at least in part on performing one or more inverse Fourier transform operations on the received set of reference signals, the set of inverse Fourier transform values corresponding to a set of time-domain indices associated with the multi-path channel; and
generate the time-domain channel estimate based at least in part on applying the filtering operator to the set of inverse Fourier transform values.

27. The apparatus of claim 24, wherein, to generate the time-domain channel estimate, the one or more processors are individually or collectively operable to execute the code to cause the apparatus to:
generate one or both of a first portion of the time-domain channel estimate or a second portion of the time-domain channel estimate, wherein the first portion of the time-domain channel estimate is based at least in part on one or more of a set of inverse Fourier transform values associated with the received set of reference signals, the filtering operator, or a scalar inversion algorithm, and wherein the second portion of the time-domain channel estimate is based at least in part on one or more of the set of inverse Fourier transform values, the filtering operator, or an iterative algorithm.

28. The apparatus of claim 27, wherein:
the first portion of the time-domain channel estimate is based at least in part on a diagonal component of the filtering operator; and
the second portion of the time-domain channel estimate is based at least in part on one or both of the filtering operator or a non-diagonal component of the filtering operator.

29. The apparatus of claim 28, wherein the iterative algorithm comprises one or more of a conjugate gradient algorithm, a combination of a conjugate gradient algorithm and a preconditioning operation, or a Gaussian belief propagation algorithm.

30. The apparatus of claim 22, wherein the one or more processors are individually or collectively operable to execute the code to cause the apparatus to receive one or more of a system information block, a radio resource control message, a multicast control channel 3 message, or downlink control information indicating the set of resources.

* * * * *